United States Patent
Kim et al.

(10) Patent No.: US 11,894,901 B2
(45) Date of Patent: Feb. 6, 2024

(54) METHOD FOR TRANSMITTING AND RECEIVING CSI IN WIRELESS COMMUNICATION SYSTEM AND DEVICE THEREFOR

(71) Applicant: LG ELECTRONICS INC., Seoul (KR)

(72) Inventors: Kyuseok Kim, Seoul (KR); Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/090,352

(22) Filed: Dec. 28, 2022

(65) Prior Publication Data

US 2023/0254023 A1    Aug. 10, 2023

Related U.S. Application Data

(63) Continuation of application No. PCT/KR2021/020011, filed on Dec. 28, 2021.

(30) Foreign Application Priority Data

Dec. 29, 2020    (KR) .......................... 10-2020-0186175
Dec. 31, 2020    (KR) .......................... 10-2020-0189228

(51) Int. Cl.
*H04B 7/06*      (2006.01)
*H04B 17/345*    (2015.01)
*H04B 7/024*     (2017.01)
*H04B 7/0456*    (2017.01)
*H04L 5/00*      (2006.01)

(52) U.S. Cl.
CPC ....... *H04B 7/0626* (2013.01); *H04B 7/06968* (2023.05)

(58) Field of Classification Search
CPC .......................... H04B 7/0626; H04B 7/06968
See application file for complete search history.

(56) References Cited

U.S. PATENT DOCUMENTS

| | | | |
|---|---|---|---|
| 2020/0153572 A1 | 5/2020 | Tsai et al. | |
| 2020/0235832 A1 | 7/2020 | Lee et al. | |
| 2020/0373985 A1 | 11/2020 | Tsai | |
| 2022/0264348 A1* | 8/2022 | Manolakos | ........... H04L 5/0073 |

(Continued)

FOREIGN PATENT DOCUMENTS

| | | |
|---|---|---|
| WO | 2020/215105 A2 | 10/2020 |
| WO | 2020/232627 A1 | 11/2020 |

*Primary Examiner* — Harry H Kim
(74) *Attorney, Agent, or Firm* — BRYAN CAVE LEIGHTON PAISNER LLP

(57) ABSTRACT

The present specification proposes a method for transmitting and receiving CSI in a wireless communication system, and a device therefor. The method performed by a terminal can comprise the steps of: receiving information relating to a CSI-RS resource set, wherein the information relating to the CSI-RS resource set comprises information relating to a resource pair, and the resource pair comprises a first channel measurement resource (CMR) and a second CMR configured in the same slot as the first CMR; receiving at least one CSI-RS on the basis of the first CMR and second CMR; and transmitting CSI on the basis of the at least one CSI-RS.

13 Claims, 16 Drawing Sheets

(56) References Cited

U.S. PATENT DOCUMENTS

| | | | |
|---|---|---|---|
| 2023/0026501 A1* | 1/2023 | Li | H04B 7/0695 |
| 2023/0028703 A1* | 1/2023 | Khoshnevisan | H04W 52/325 |
| 2023/0156487 A1* | 5/2023 | Wu | H04L 1/1819 |
| | | | 370/329 |
| 2023/0164822 A1* | 5/2023 | Faxér | H04W 72/0446 |
| | | | 370/329 |

* cited by examiner

[FIG. 1]
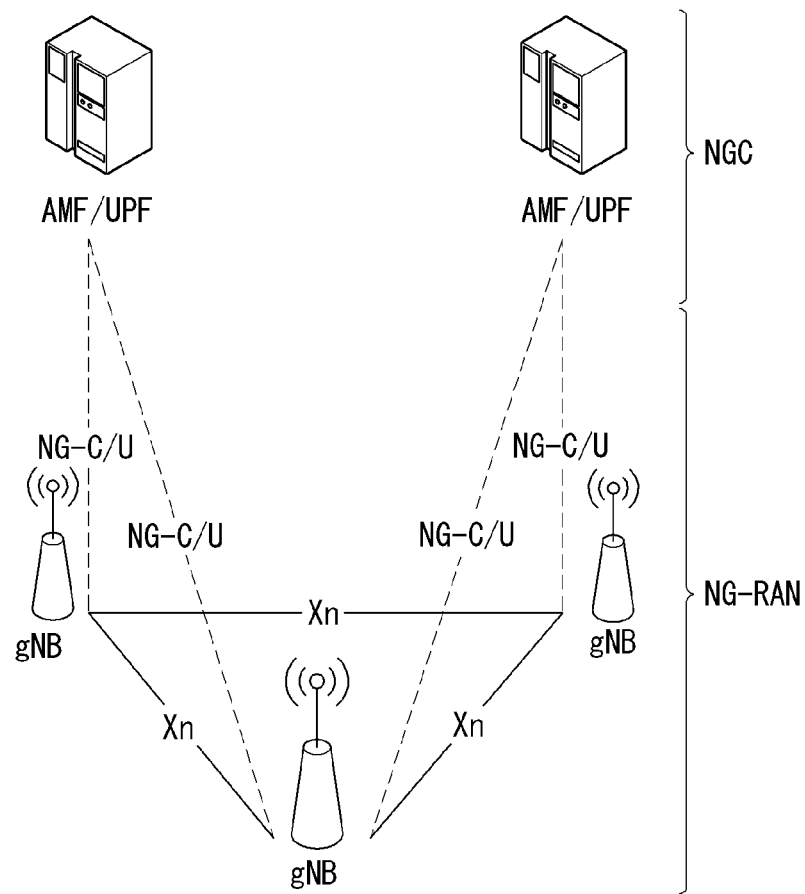
[FIG. 2]
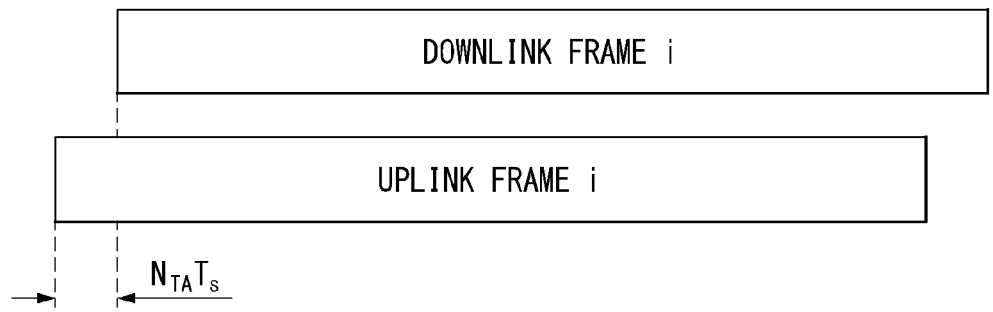

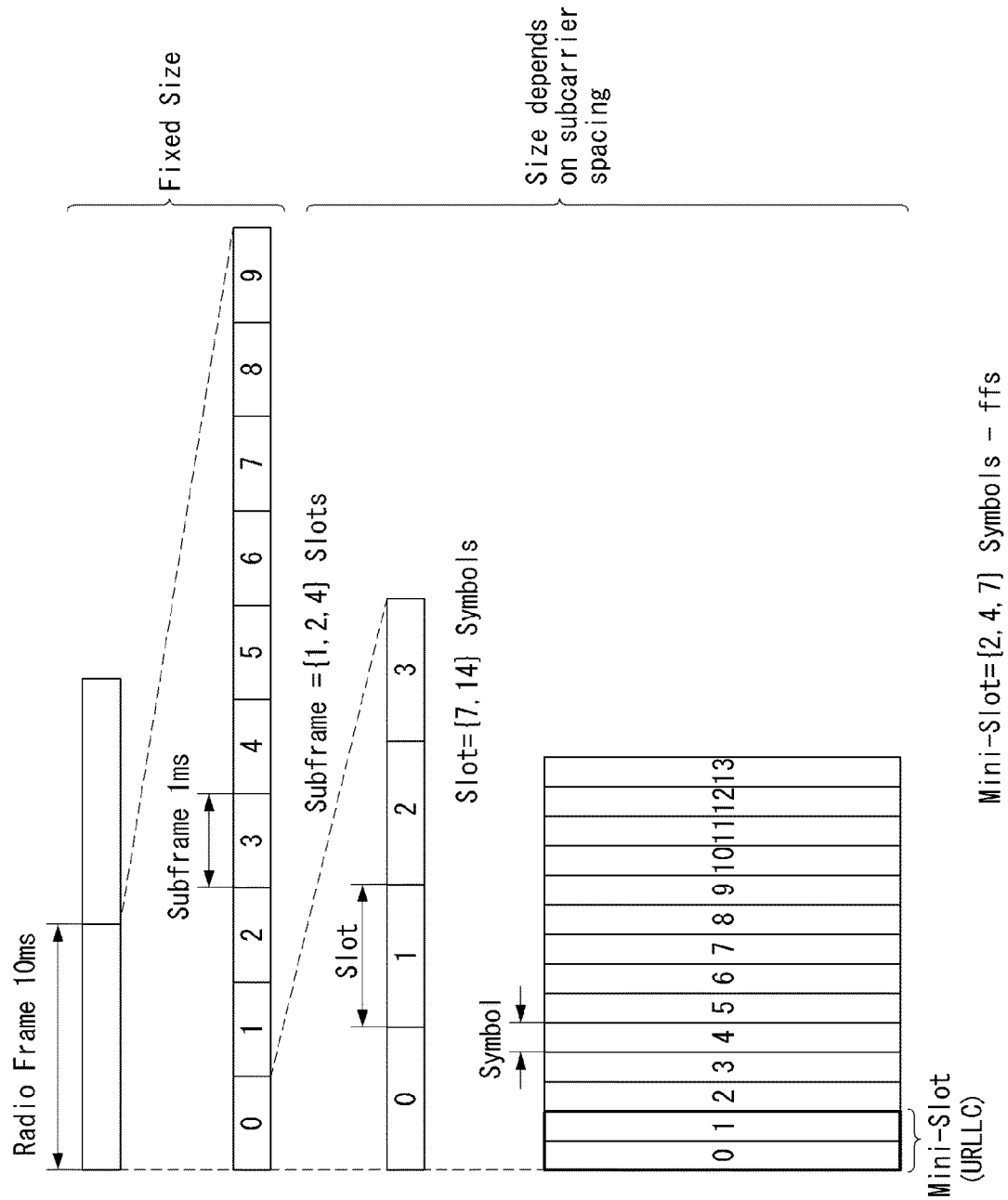
[FIG. 3]

[FIG. 4]
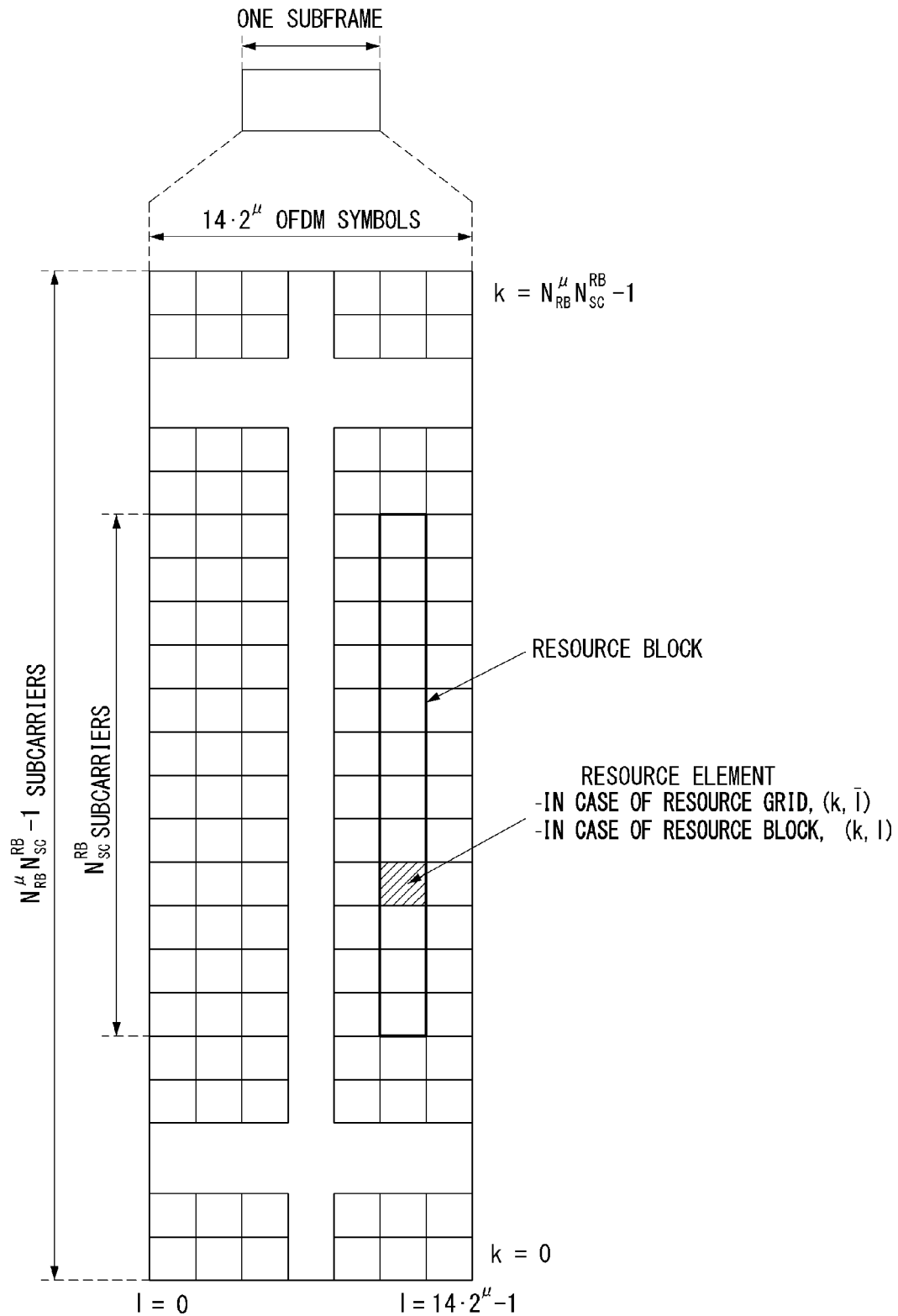

[FIG. 5]
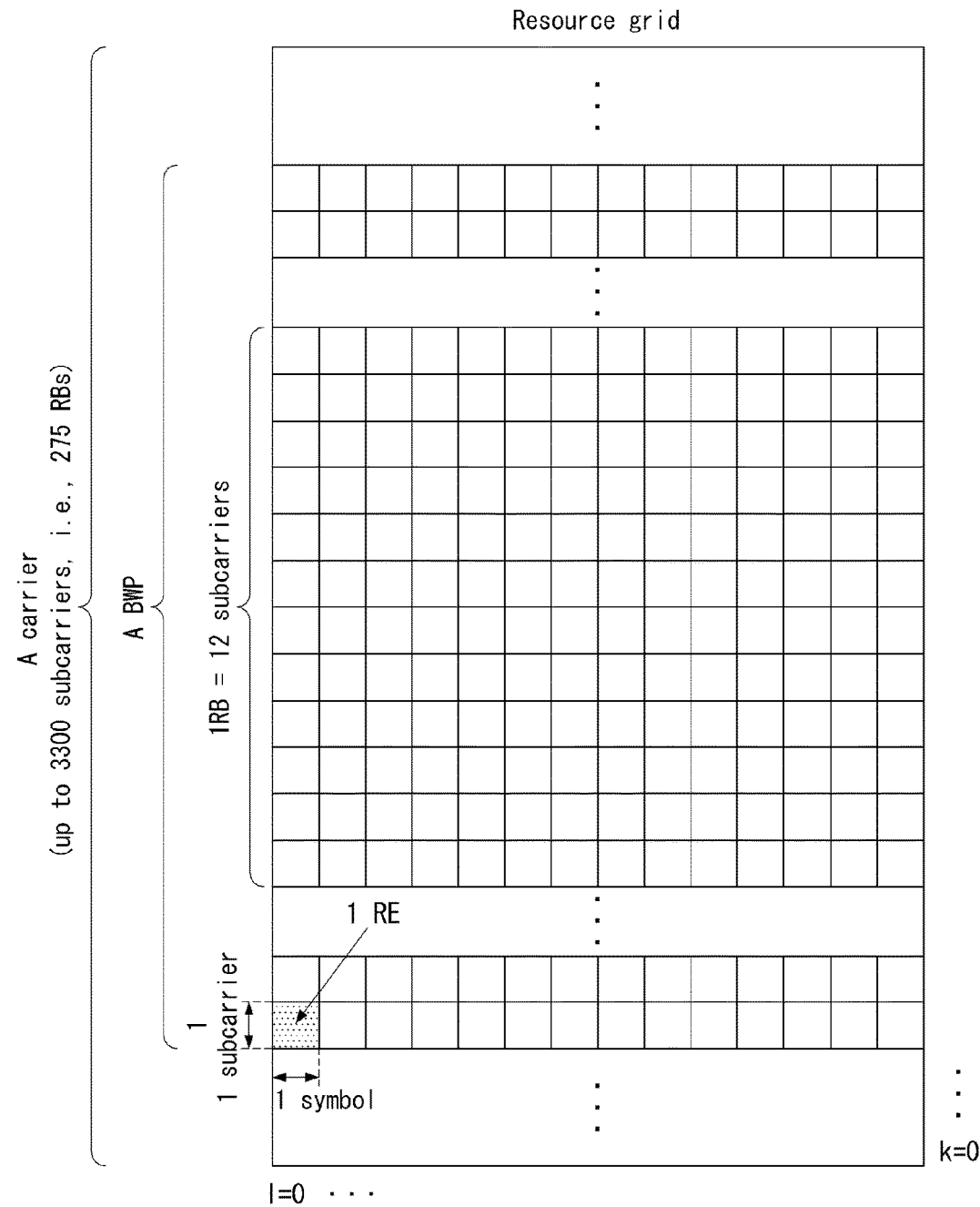

[FIG. 6]
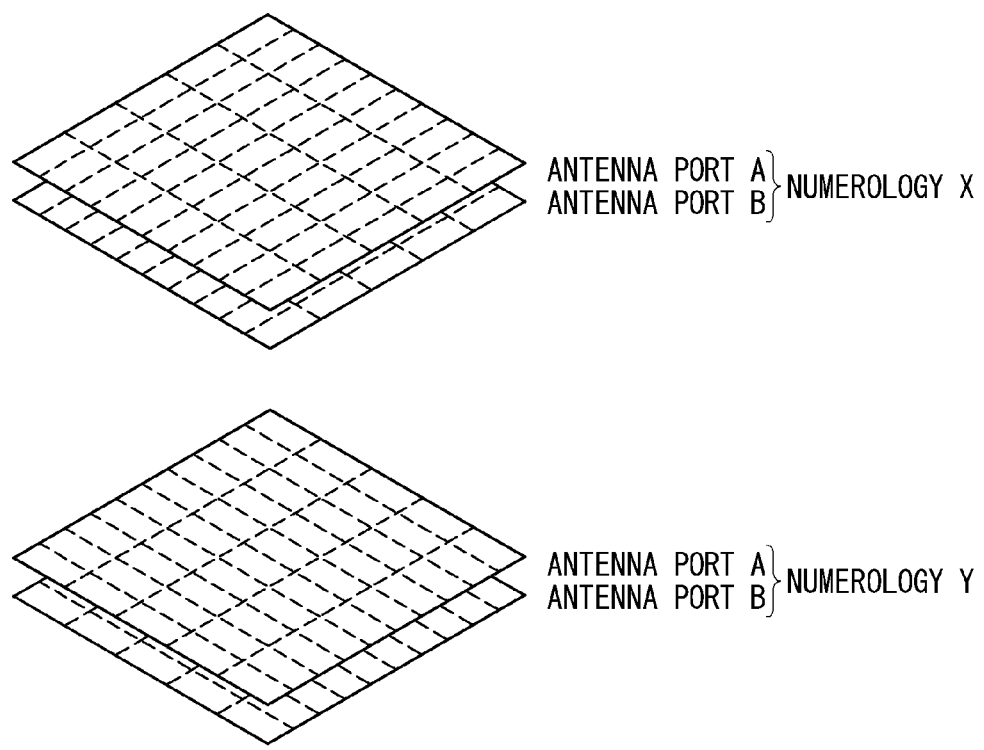

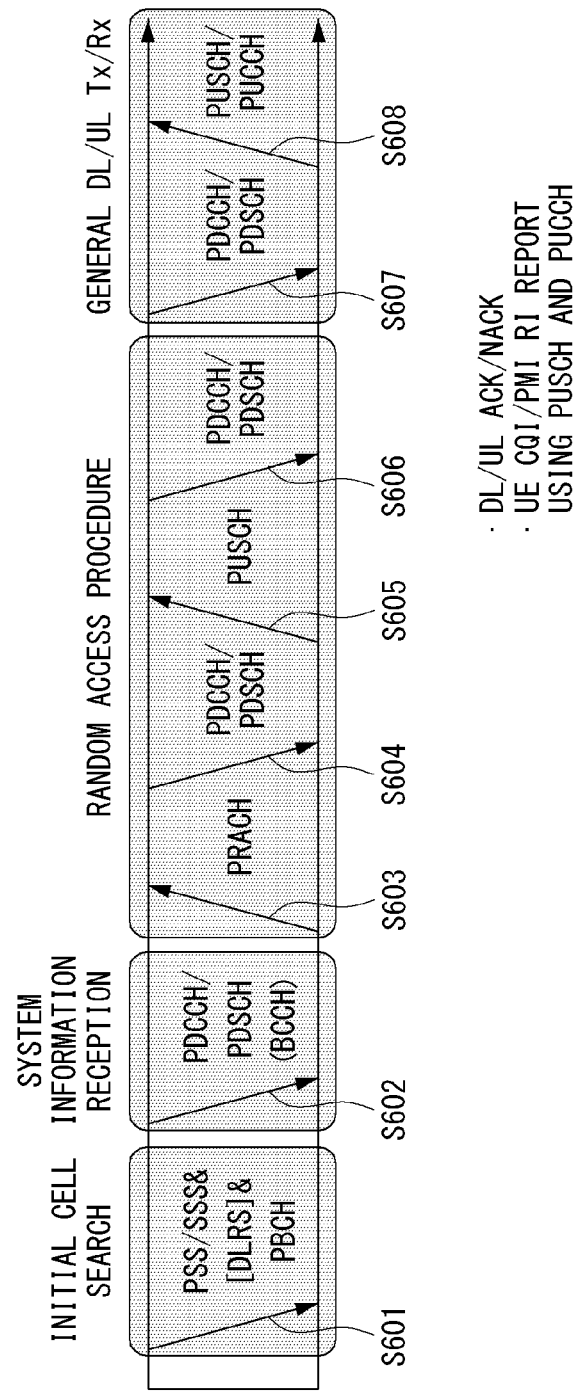
[FIG. 7]

[FIG. 8]
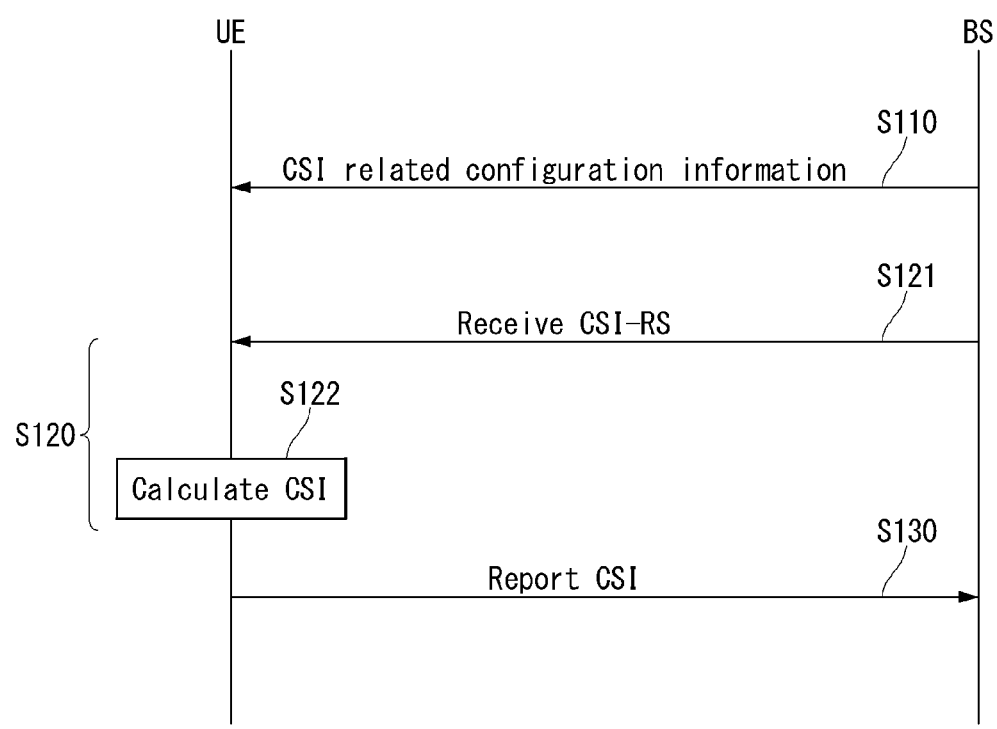

[FIG. 9]
(a)
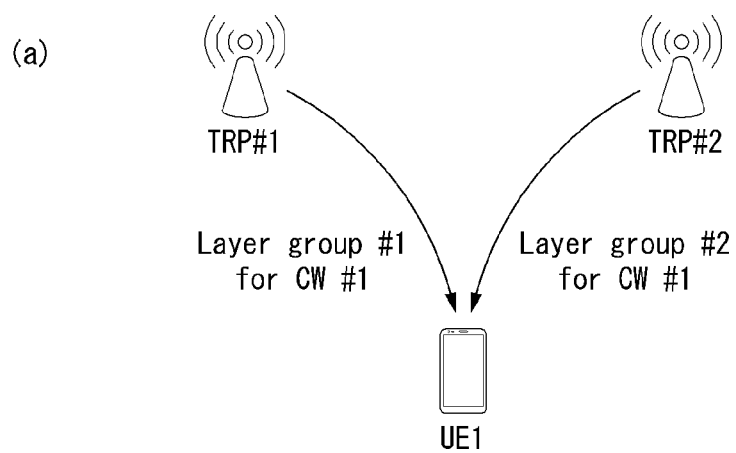
(b)
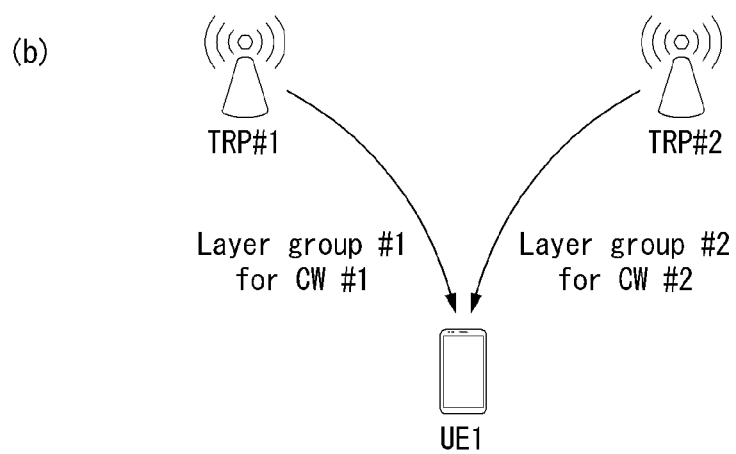

[FIG. 10]
(a)
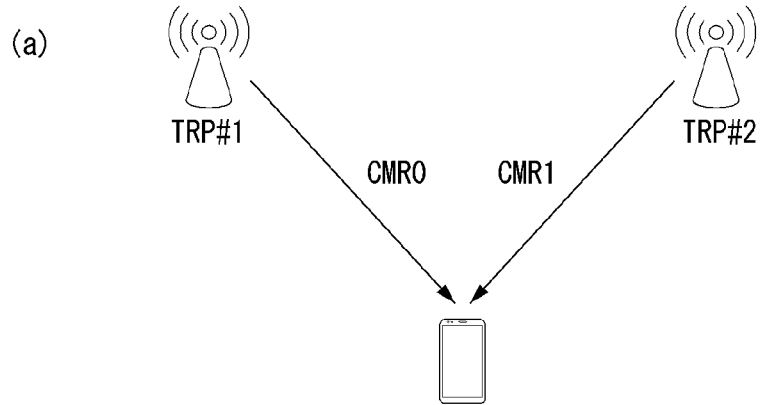
(b)
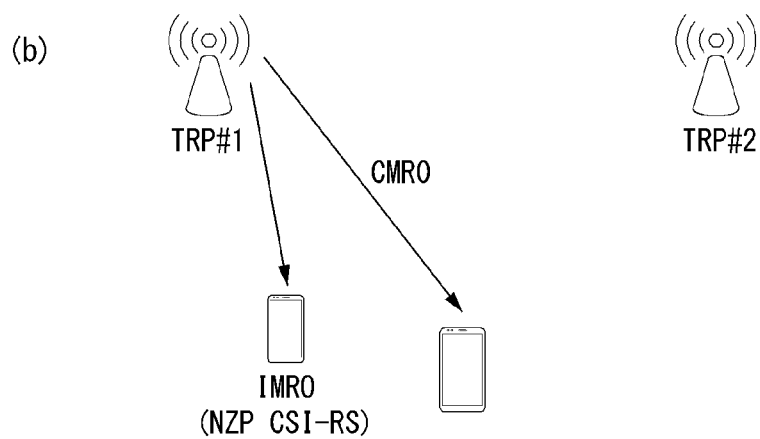
(c)
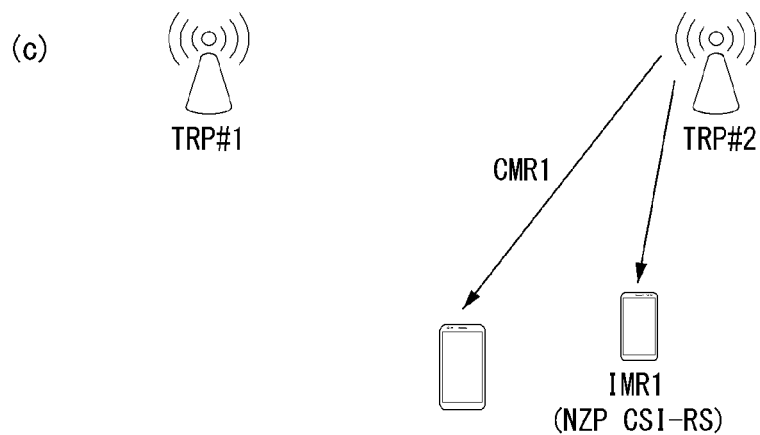

[FIG. 11]
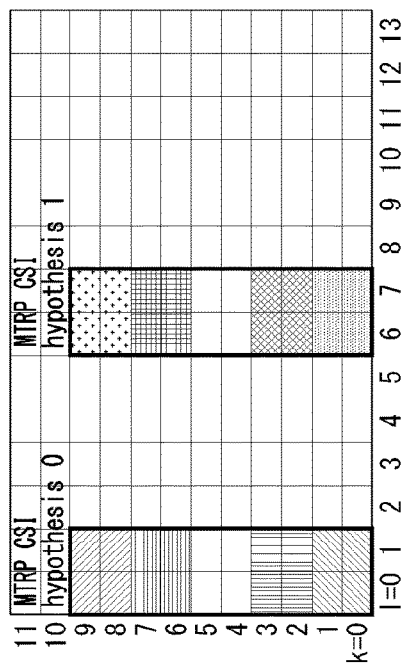
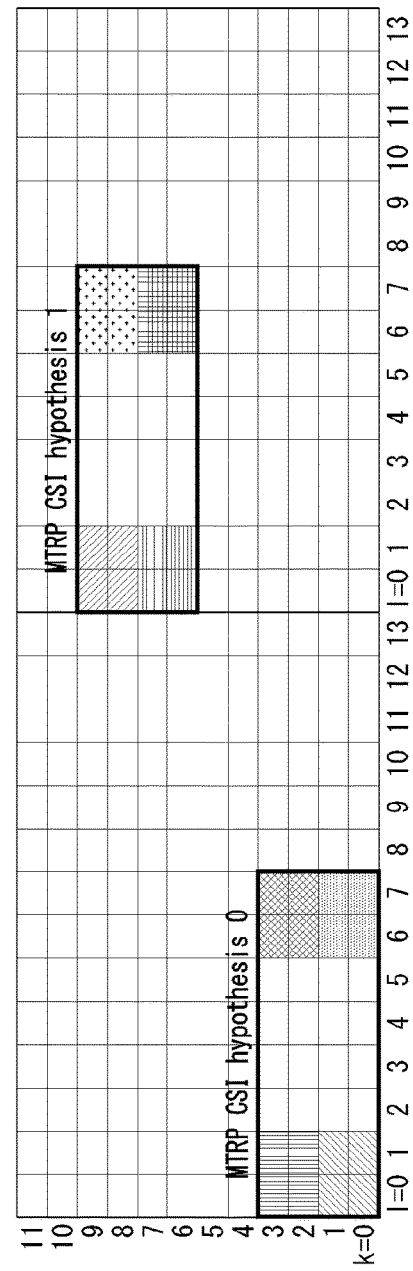

[FIG. 12]
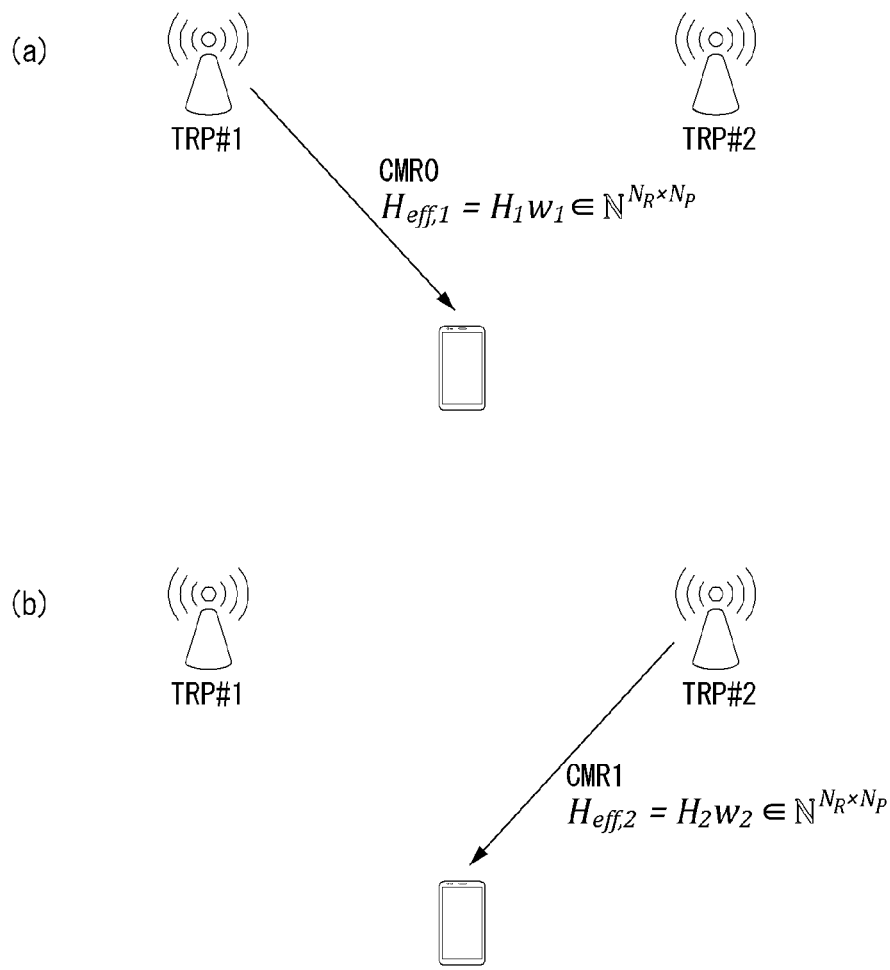

[FIG. 13]
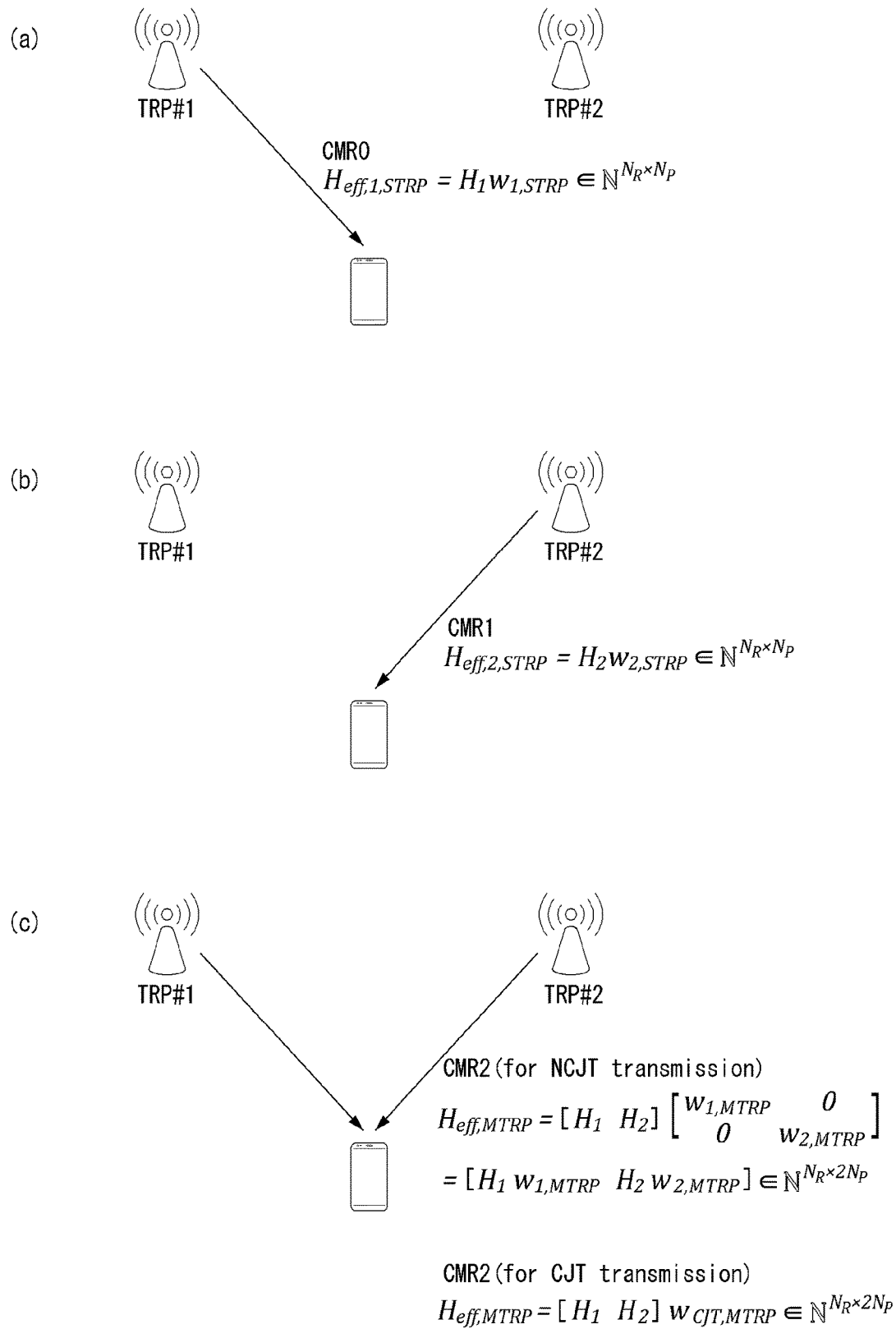

[FIG. 14]
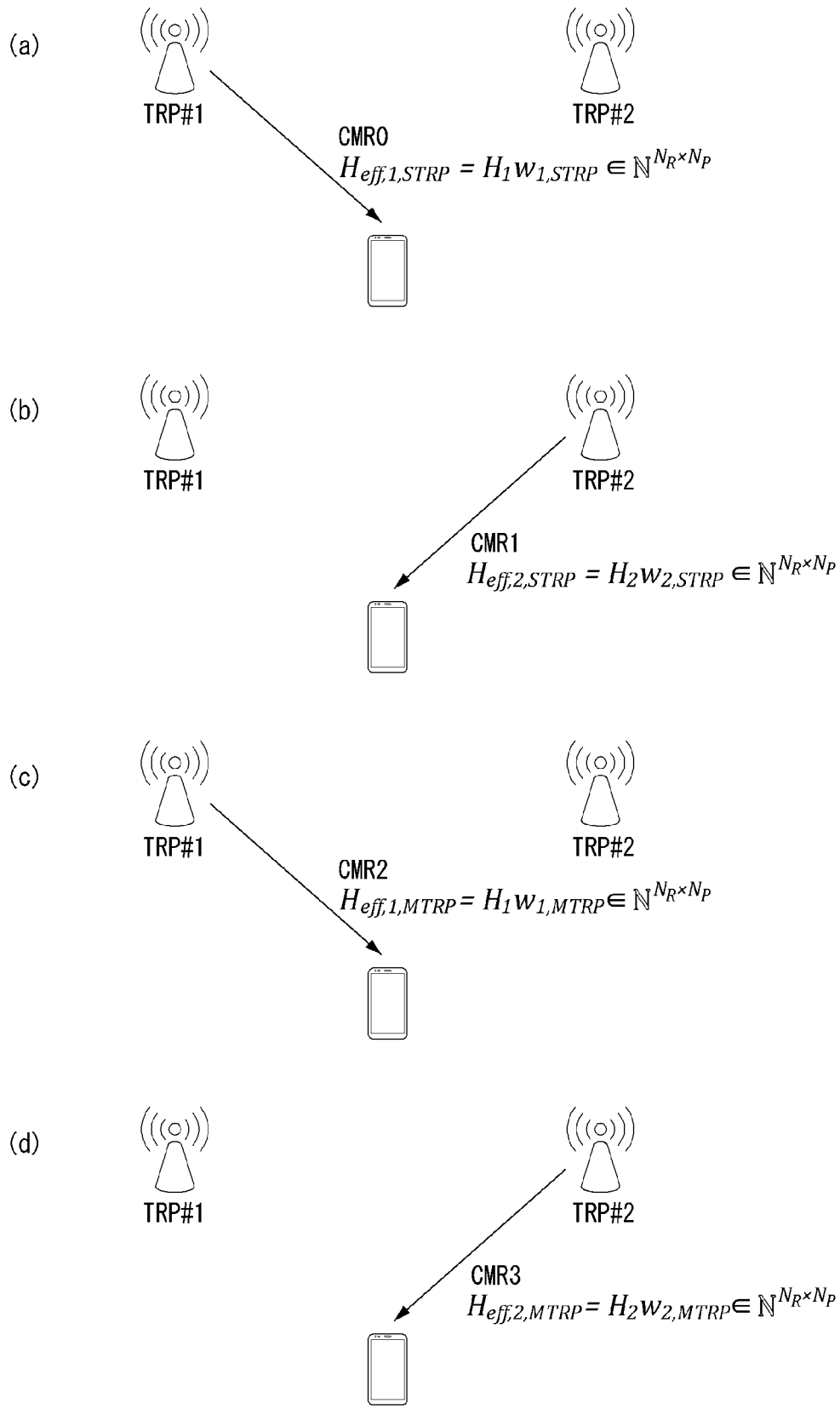

【FIG. 15】
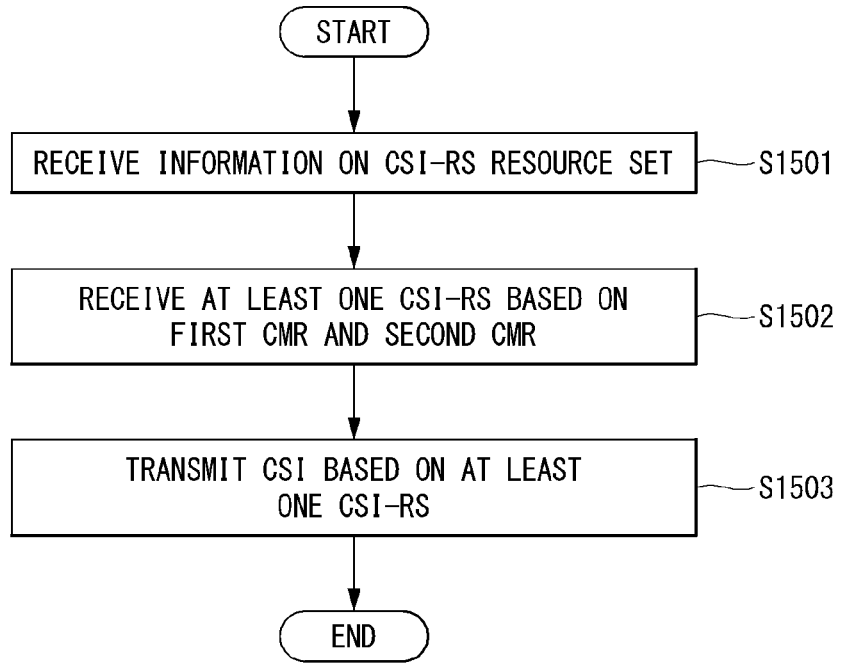
【FIG. 16】
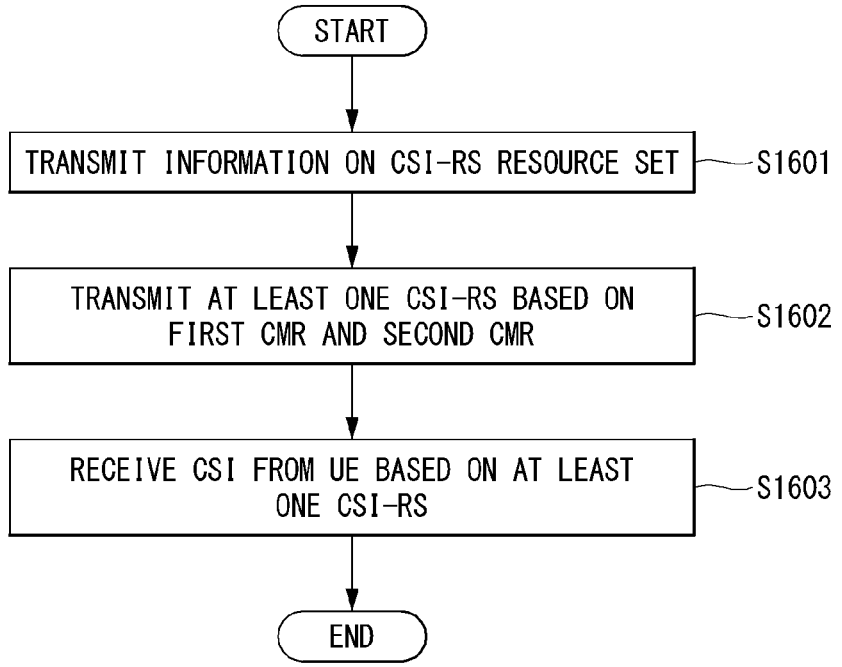

[FIG. 17]
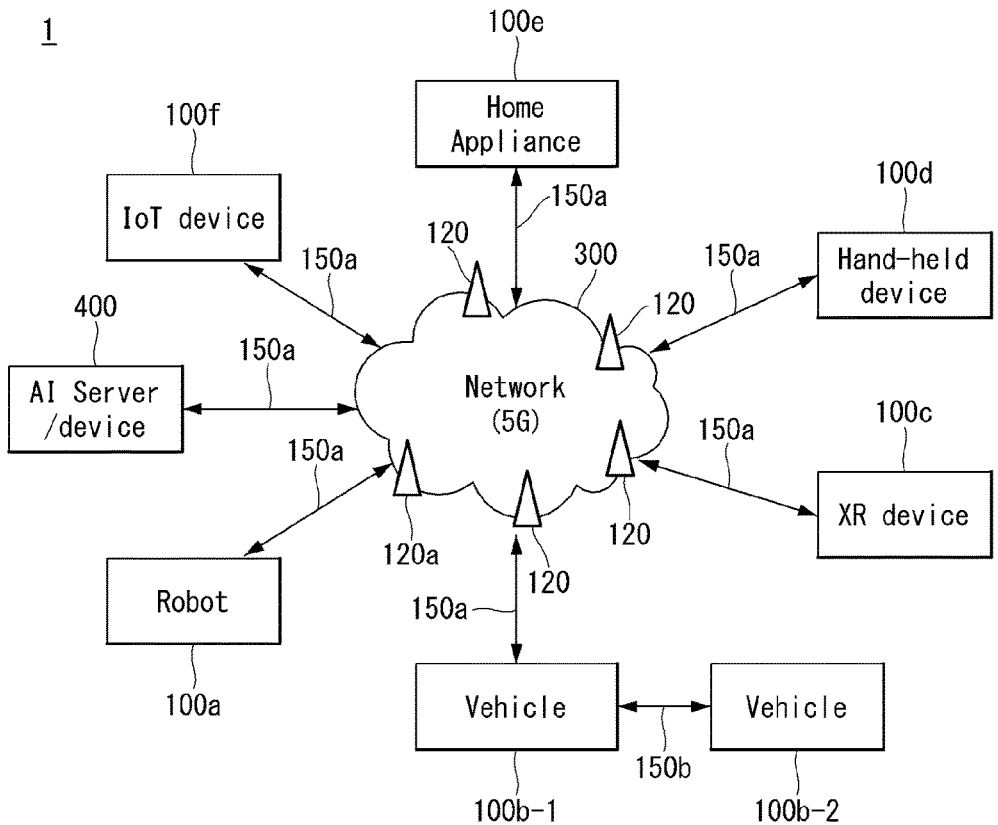
[FIG. 18]
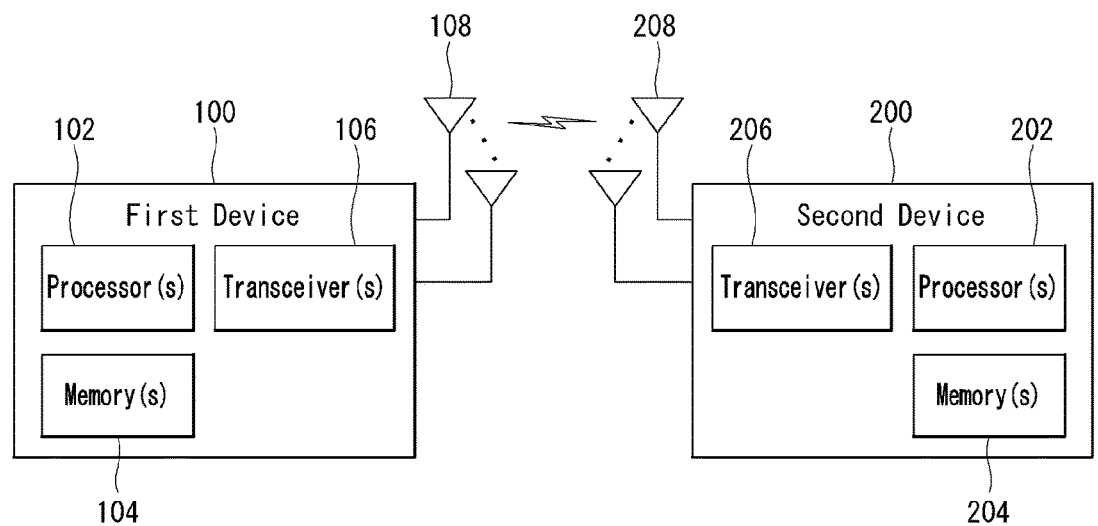

[FIG. 19]
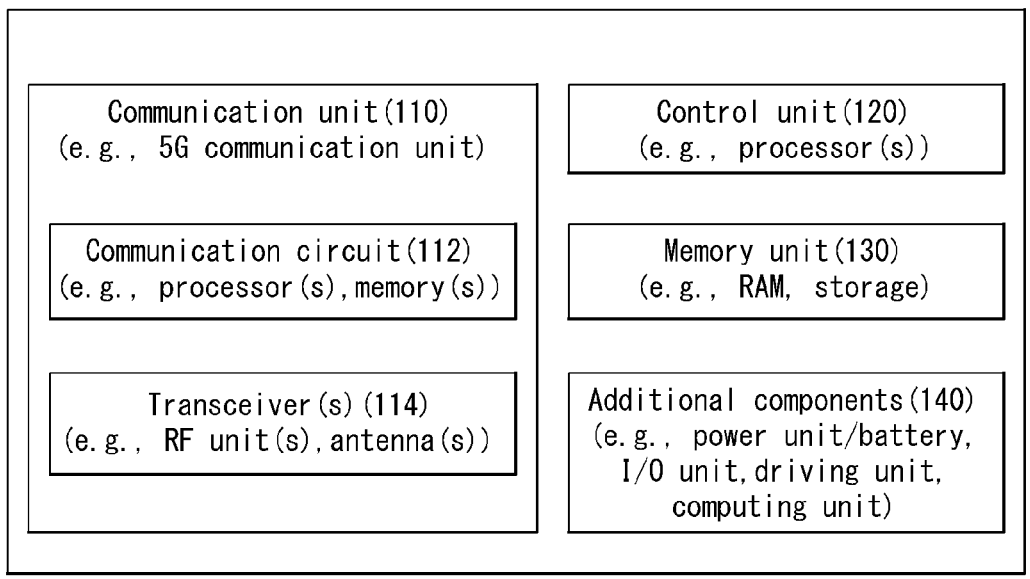
[FIG. 20]
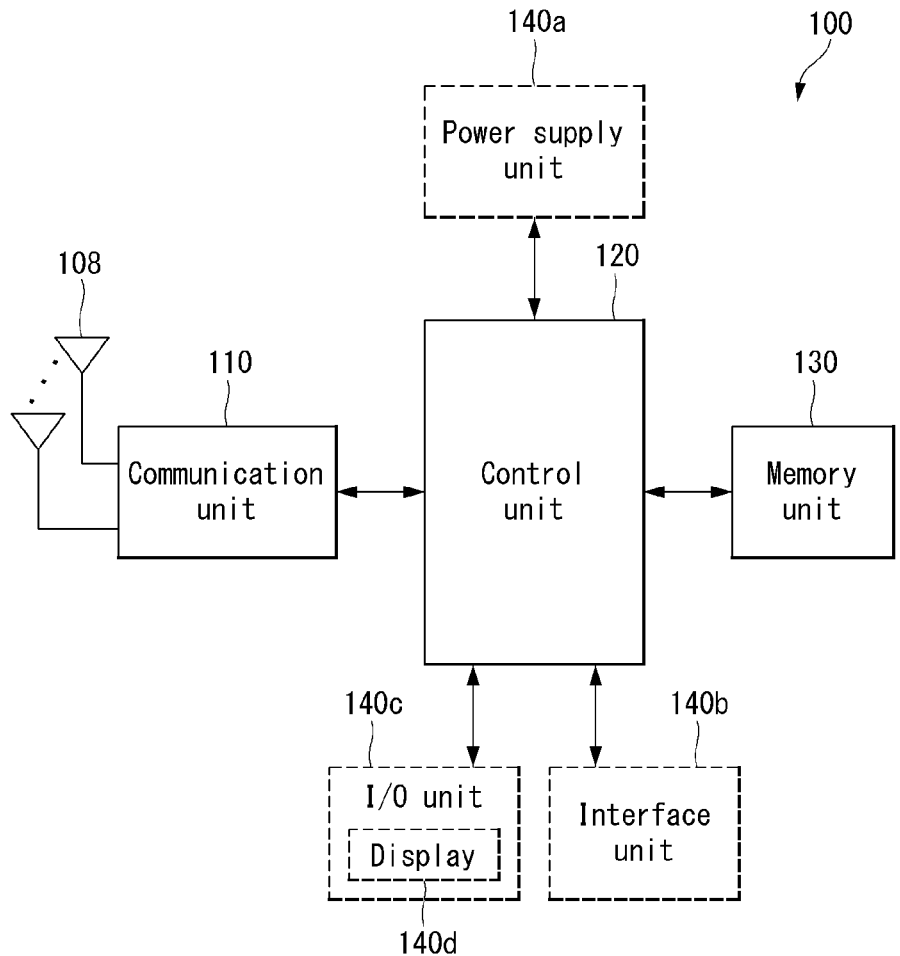

METHOD FOR TRANSMITTING AND RECEIVING CSI IN WIRELESS COMMUNICATION SYSTEM AND DEVICE THEREFOR

CROSS-REFERENCE TO RELATED APPLICATIONS

This application is a Bypass Continuation Application of International Application No. PCT/KR2021/020011, filed on Dec. 28, 2021, which claims the benefit of KR patent Application No. 10-2020-0186175, filed on Dec. 29, 2020, and KR patent Application No. 10-2020-0189228, filed on Dec. 31, 2020, the contents of which are all hereby incorporated by reference herein in their entirety.

TECHNICAL FIELD

The present disclosure relates to a wireless communication system, and more particularly, to a method for transmitting and receiving channel state information (CSI) and a device therefor.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

Meanwhile, technologies for calculating/reporting CSI considering a plurality of transmission reception points (TRPs) in a TRP environment have been discussed.

DISCLOSURE

Technical Problem

The present disclosure proposes a method and apparatus for configuring/defining/indicating/using a resource pair including two channel measurement resources (CMR).

In addition, the present disclosure proposes a method and apparatus for configuring two CMRs included in a resource pair in the same slot.

In addition, the present disclosure proposes a method and apparatus for not transmitting/receiving a resource/channel/signal in which a reference signal (RS) is set other than a QCL-TypeD RS set in two CMRs included in a resource pair in the same time domain of at least one of two CMRs.

In addition, the present disclosure proposes a method and apparatus for setting/indicating/defining/using antenna port index(s) for each rank indicator (RI) for a resource pair and an apparatus therefor.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure proposes a method for transmitting channel state information (CSI) in a wireless communication system. The method performed by a user equipment (UE) includes receiving information on CSI-reference signal (RS) resource set, the information on the CSI-RS resource set including information on a resource pair, the resource pair including a first channel measurement resource (CMR) and a second CMR set in the same slot as that of the first CMR; receiving at least one CSI-RS based on the first CMR and the second CMR; and transmitting the CSI based on the at least one CSI-RS.

In the method of the present disclosure, the resource pair is a resource unit for calculating the CSI.

Also, in the method of the present disclosure, the at least one CSI-RS may include a CSI-RS received in the first CMR from a first transmission reception point (TRP) and a CSI-RS received in the second CMR from a second TRP.

Also, in the method of the present disclosure, the CSI may be CSI for non-coherent joint transmission (NCJT).

Also, in the method of the present disclosure, the first CMR may be set as a first quasi co-location (QCL)-TypeD RS and the second CMR is set as a second QCL-TypeD RS.

Also, in the method of the present disclosure, a third QCL-TypeD RS may correspond to an RS different from the first QCL-TypeD RS and the second QCL-TypeD RS, and a resource, a channel, or a signal set as the third QCL-TypeD RS may not be received in the same time domain as that of the first CMR or the second CMR.

Also, in the method of the present disclosure, the resource pair may correspond to at least one interference measurement resource (IMR).

Also, in the method of the present disclosure, the first CMR or the second CMR may be set to at least one antenna port index for each rank indicator (RI).

Also, in the present disclosure, a user equipment (UE) configured to transmit channel state information (CSI) in a wireless communication system includes at least one transceiver; at least one processor; and at least one memory operatively coupled to the at least one processor and configured to store instructions for performing operations based on being executed by the at least one processor, wherein the operations include: receiving information on CSI-reference signal (RS) resource set, the information on the CSI-RS resource set including information on a resource pair, the resource pair including a first channel measurement resource (CMR) and a second CMR set in the same slot as that of the first CMR; receiving at least one CSI-RS based on the first CMR and the second CMR; and transmitting the CSI based on the at least one CSI-RS.

Also, in the present disclosure, a method of receiving channel state information (CSI) in a wireless communication system is proposed. The method performed by a base station (BS) includes: transmitting, to a user equipment (UE), information on CSI-reference signal (RS) resource set, the information on the CSI-RS resource set including information on a resource pair, the resource pair including a first channel measurement resource (CMR) and a second CMR set in the same slot as that of the first CMR, transmitting, to the UE, at least one CSI-RS based on the first CMR and the second CMR, and receiving, from the UE, the CSI based on the at least one CSI-RS.

Also, in the method of the present disclosure, the resource pair may be a resource unit for calculating the CSI.

Also, in the method of the present disclosure, the at least one CSI-RS may include a CSI-RS transmitted in the first CMR by a first transmission reception point (TRP) and a CSI-RS transmitted in the second CMR by a second TRP.

Also, in the method of the present disclosure, the CSI may be CSI for non-coherent joint transmission (NCJT).

Also, in the method of the present disclosure, the first CMR may be set as a first quasi co-location (QCL)-TypeD RS and the second CMR is set as a second QCL-TypeD RS.

Also, in the method of the present disclosure, a third QCL-TypeD RS may correspond to an RS different from the first QCL-TypeD RS and the second QCL-TypeD RS, and a resource, a channel, or a signal set as the third QCL-TypeD RS is not received in the same time domain as that of the first CMR or the second CMR.

Also, in the method of the present disclosure, the resource pair corresponds to at least one interference measurement resource (IMR).

Also, in the method of the present disclosure, the first CMR or the second CMR may be set to at least one antenna port index for each rank indicator (RI).

In the present disclosure, a base station (BS) configured to receive channel state information (CSI) in a wireless communication system includes at least one transceiver; at least one processor; and at least one memory operatively coupled to the at least one processor and configured to store instructions for performing operations based on being executed by the at least one processor, wherein the operations include: transmitting, to a user equipment (UE), information on CSI-reference signal (RS) resource set, the information on the CSI-RS resource set including information on a resource pair, the resource pair including a first channel measurement resource (CMR) and a second CMR set in the same slot as that of the first CMR; transmitting, to the UE, at least one CSI-RS based on the first CMR and the second CMR; and receiving, from the UE, the CSI based on the at least one CSI-RS.

Also, in the present disclosure, a processing apparatus configured to control a user equipment (UE) to transmit channel state information (CSI) in a wireless communication system includes at least one processor; and at least one memory operatively coupled to the at least one processor and configured to store instructions for performing operations based on being executed by the at least one processor, wherein the operations include: receiving information on CSI-reference signal (RS) resource set, the information on the CSI-RS resource set including information on a resource pair, the resource pair including a first channel measurement resource (CMR) and a second CMR set in the same slot as that of the first CMR; receiving at least one CSI-RS based on the first CMR and the second CMR; and transmitting the CSI based on the at least one CSI-RS.

Also, in the present disclosure, in a computer-readable storage medium storing at least one instruction for at least one processor to control operations, based on being executed by the at least one processor, the operations include: receiving information on CSI-reference signal (RS) resource set, the information on the CSI-RS resource set including information on a resource pair, the resource pair including a first channel measurement resource (CMR) and a second CMR set in the same slot as that of the first CMR; receiving at least one CSI-RS based on the first CMR and the second CMR; and transmitting the CSI based on the at least one CSI-RS.

Advantageous Effects

According to the present disclosure, by setting/defining/indicating/using a resource pair including two CMRs, a channel situation in a plurality of TRP environments may be more accurately recognized.

In addition, according to the present disclosure, by setting two CMRs included in a resource pair in the same slot, a time-varying effect that may occur by different CMRs may be improved.

In addition, according to the present disclosure, by setting two CMRs included in a resource pair in the same slot, a CSI-RS receiving time required for CSI calculation may be reduced.

In addition, according to the present disclosure, resources/channels/signals in which RSs other than the QCL-TypeD reference RSs set in two CMRs included in a resource pair are not transmitted/received in the same time domain as that of at least one of two CMRs, so that the efficiency of resource utilization may be improved.

In addition, according to the present disclosure, by setting/indicating/defining/using antenna port index(es) for each RI for a resource pair, the influence of inter-CMR interference may be reduced.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of the present disclosure illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates a slot structure of an NR frame to which the method proposed in the present disclosure may be applied.

FIG. 6 illustrates examples of a resource grid for each antenna port and numerology to which a method proposed in the present disclosure may be applied.

FIG. 7 illustrates physical channels and general signal transmission.

FIG. 8 is a flowchart illustrating an example CSI-related procedure.

FIG. 9($a$) and FIG. 9($b$) show transmission/reception method for improving reliability in a plurality of TRPs.

FIG. 10(a), FIG. 10(b) and FIG. 10(c) show examples of assumptions of CMR and IMR in each hypothesis assumption.

FIG. 11(a) and FIG. 11(b) show an example of defining an MTRP CSI hypothesis based on different resource combinations transmitted in the same symbol(s) and/or the same slot.

FIG. 12(a) and FIG. 12(b) show an example for option 1.

FIG. 13(a), FIG. 13(b) and FIG. 13(c) show an example for option 2.

FIG. 14(a), FIG. 14(b), FIG. (c), and FIG. 14(d) show an example for option 1-1.

FIG. 15 is a flowchart illustrating a method of operating a terminal proposed in the present disclosure.

FIG. 16 is a flowchart illustrating a method of operating a base station proposed in the present disclosure.

FIG. 17 illustrates a communication system 1 applied to the present disclosure.

FIG. 18 illustrates a wireless device applicable to the present disclosure.

FIG. 19 illustrates another example of a wireless device applied to the present disclosure.

FIG. 20 illustrates a portable device applied to the present disclosure.

MODE FOR DISCLOSURE

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
    36.211: Physical channels and modulation
    36.212: Multiplexing and channel coding
    36.213: Physical layer procedures
    36.300: Overall description
    36.331: Radio Resource Control (RRC)

3GPP NR
    38.211: Physical channels and modulation
    38.212: Multiplexing and channel coding
    38.213: Physical layer procedures for control
    38.214: Physical layer procedures for data
    38.300: NR and NG-RAN Overall Description
    38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain Different numerologies may be defined by scaling reference subcarrier spacing to an integer N.

Definition of Terms eLTE eNB: The eLTE eNB is the evolution of eNB that supports connectivity to EPC and NGC.
gNB: A node which supports the NR as well as connectivity to NGC.
New RAN: A radio access network which supports either NR or E-UTRA or interfaces with the NGC.
Network slice: A network slice is a network created by the operator customized to provide an optimized solution for a specific market scenario which demands specific requirements with end-to-end scope.
Network function: A network function is a logical node within a network infrastructure that has well-defined external interfaces and well-defined functional behavior.
NG-C: A control plane interface used on NG2 reference points between new RAN and NGC.
NG-U: A user plane interface used on NG3 references points between new RAN and NGC.
Non-standalone NR: A deployment configuration where the gNB requires an LTE eNB as an anchor for control plane connectivity to EPC, or requires an eLTE eNB as an anchor for control plane connectivity to NGC.
Non-standalone E-UTRA: A deployment configuration where the eLTE eNB requires a gNB as an anchor for control plane connectivity to NGC.
User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in a table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may refer to a millimeter wave (mmW).

TABLE 2

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHz | 60, 120, 240 kHz |

Regarding a frame structure in the NR system, a size of various fields in the time) domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_{sf}=(\Delta f_{max} N_f/1000) \cdot T_s=1$ ms. The radio frame is including ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $N_s^\mu \in \{0, \ldots, N_{subframe}^{slots,\,\mu}-1\}$ within a subframe and are numbered in increasing order of $N_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $N_s^\mu$ in a subframe is aligned in time with the start of OFDM symbols $N_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\,\mu}$ | $N_{slot}^{subframe,\,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may include 2, 4, or 7 symbols, or may include more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe including 14·2μ OFDM symbols, but the present disclosure is not limited thereto.

In the NR system, a transmitted signal is described by one or more resource grids, including $N_{RB}^\mu N_{sc}^{RB}$ subcarriers, and $2^\mu N_{symb}^{(\mu)}$ OFDM symbols, where $N_{RB}^\mu \le N_{RB}^{max,\mu}$. $N_{RB}^{max,\mu}$ denotes a maximum transmission bandwidth and may change not only between numerologies but also between uplink and downlink.

In this case, as illustrated in FIG. 6, one resource grid may be configured per numerology μ and antenna port p.

FIG. 5 illustrates a slot structure of an NR frame to which the method proposed in the present disclosure may be applied.

A slot includes a plurality of symbols in a time domain. For example, in the case of a normal CP, one slot includes 7 symbols, but in the case of an extended CP, one slot includes 6 symbols. A carrier includes a plurality of subcarriers in a frequency domain A resource block (RB) is defined as a plurality of (e.g., 12) consecutive subcarriers in the frequency domain. A bandwidth part (BWP) is defined as a plurality of consecutive (P)RBs in the frequency domain, and may correspond to one numerology (e.g., SCS, CP length, etc.). A carrier may include a maximum of N (e.g., 5) BWPs. Data communication is performed through the activated BWP, and only one BWP may be activated for one terminal. Each element in the resource grid is referred to as a resource element (RE), and one complex symbol may be mapped.

FIG. 6 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^\mu N_{sc}^{RB}-1$ is an index on a frequency domain, and l̄=0, . . . , $2^\mu N_{symb}^{(\mu)}-1$ refers to a location of a symbol in a subframe. The index pair (k,l) is used to refer to a resource element in a slot, where l=0, . . . , $N_{symb}^\mu-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indices p and μ may be dropped, and as a result, the complex value may be $a_{k,\bar{l}}^{(p)}$ or $a_{k,\bar{l}}$.

Further, a physical resource block is defined as $N_{sc}^{RB}=12$ se consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration µ.

The center of subcarrier 0 of common resource block 0 for the subcarrier spacing configuration µ coincides with "point A". A common resource block number $n_{CRB}^{\mu}$ in the frequency domain and resource elements (k, l) for the subcarrier spacing configuration µ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, N may be the common resource block where the BWP starts relative to the common resource block 0.

Physical Channel and General Signal Transmission

FIG. 7 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Hereinafter, in the present disclosure, the contents of the CSI-related operation may refer to all/part from the following content to the aperiodic CSI trigger state sub-selection contents.

Channel State Information (CSI)-Related Procedure

In the new radio (NR) system, a channel state information-reference signal (CSI-RS) is used for time/frequency tracking, CSI computation, layer 1(L1)-reference signal received power (RSRP) computation, or mobility. The CSI computation is related to CSI acquisition, and L1-RSRP computation is related to beam management (BM).

Channel state information (CSI) refers to information that may indicate the quality of a radio channel (or link) formed between a terminal and an antenna port.

FIG. 8 is a flowchart illustrating an example of a CSI-related procedure.

Referring to FIG. 8, to perform one of the above purposes of a CSI-RS, a terminal (e.g., a UE) receives CSI related configuration information from a base station (e.g., a general node B (gNB)) through a radio resource control (RRC) signaling(S110).

The CSI-related configuration information may include at least one of CSI interference management (IM) resource-related information, CSI measurement configuration-related information, CSI resource configuration-related information, CSI-RS resource-related information, or CSI reporting configuration-related information.

i) The CSI-IM resource-related information may include CSI-IM resource information, CSI-IM resource set information, etc. The CSI-IM resource set is identified by a CSI-IM resource set ID (identifier), and one resource set includes at least one CSI-IM resource. Each CSI-IM resource is identified by a CSI-IM resource ID.

ii) The CSI resource configuration-related information defines a group including at least one of a non-zero power (NZP) CSI-RS resource set, a CSI-IM resource set, or a CSI-SSB resource set. That is, the CSI resource configuration-related information includes a CSI-RS resource set list, and the CSI-RS resource set list may include at least one of a NZP CSI-RS resource set list, a CSI-IM resource set list, or a CSI-SSB resource set list. The CSI resource configuration-related information may be expressed as CSI-REsourceConfig IE. The CSI-RS resource set is identified by a CSI-RS resource set ID, and one resource set includes at least one CSI-RS resource. Each CSI-RS resource is identified by a CSI-RS resource ID.

As shown in Table 5, parameters (e.g.: the BM-related parameter repetition, and the tracking-related parameter trs-Info indicative of (or indicating) a purpose of a CSI-RS may be set for each NZP CSI-RS resource set.

Table 5 shows an example of NZP CSI-RS resource set IE.

TABLE 5

```
-- ASN1START
-- TAG-NZP-CSI-RS-RESOURCESET-START
NZP-CSI-RS-ResourceSet ::=           SEQUENCE {
    nzp-CSI-RS-ResourceSetId              NZP-CSI-RS-ResourceSetId,
    nzp-CSI-RS-Resources                  SEQUENCE (SIZE (1..maxNrofNZP-CSI-RS-
ResourcesPerSet) OF NZP-CSI-RS-ResourceId,
    repetition                            ENUMERATED { on, off }
    aperiodicTriggeringOffset             INTEGER (0..4)
    trs-info                              ENUMERATED {true}
    ...
}
-- TAG-NZP-CSI-RS-RESOURCESET-STOP
-- ASN1STOP
```

In addition, the parameter repetition corresponding to a higher layer parameter corresponds to "CSI-RS-ResourceRep" of L1 parameter.

The CSI reporting configuration related information includes the parameter reportConfigType indicative of a time domain behavior and the parameter reportQuantity indicative of a CSI-related quantity to be reported. The time domain behavior may be periodic, aperiodic, or semi-persistent.

The CSI reporting configuration-related information may be represented as CSI-ReportConfig IE, and Table 5 shows an example of the CSI-ReportConfig IE.

TABLE 6

```
-- ASN1START
-- TAG-CSI-RESOURCECONFIG-START
CSI-ReportConfig ::=                SEQUENCE {
    reportConfigId                      CSI-ReportConfigId,
    carrier                             ServCellIndex            OPTIONAL, -
- Need S
    resources ForChannelMeasurement     CSI-ResourceConfigId,
    csi-IM-ResourcesForInterference     CSI-ResourceConfigId     OPTIONAL, -
- Need R
    nzp-CSI-RS-ResourcesForInterference CSI-ResourceConfigId     OPTIONAL, -
- Need R
    reportConfigType                    CHOICE {
        periodic                            SEQUENCE {
            reportSlotConfig                    CSI-
ReportPeriodicityAndOffset,
            pucch-CSI-ResourceList                      SEQUENCE (SIZE
(1 .. maxNrofBWPs)) OF PUCCH-CSI-Resource
        },
        semiPersistentOnPUCCH               SEQUENCE {
            reportSlotConfig                    CSI-
ReportPeriodicityAndOffset,
            pucch-CSI-ResourceList                      SEQUENCE (SIZE
(1..maxNrofBWPs)) OF PUCCH-CSI-Resource
        },
        semiPersistentOnPUSCH               SEQUENCE {
            reportSlotConfig                    ENUMERATED {s15, s110, s120,
s140, s180, s1160, s1320},
            reportSlotOffsetList                SEQUENCE (SIZE (1..maxNrofUL-
Allocations)) OF INTEGER (0..32) ,
            p0alpha                             P0-PUSCH-AlphaSetId
        } ,
        aperiodic                           SEQUENCE {
            reportSlotOffsetList                SEQUENCE (SIZE (1..maxNrofUL-
Allocations) ) OF INTEGER (0..32)
        }
    },
    reportQuantity                      CHOICE {
        none                                NULL,
        cri-RI-PMI-CQI                      NULL,
        cri-RI-i1                           NULL,
        cri-RI-i1-CQI                       SEQUENCE {
            pdsch-BundleSizeForCSI                  ENUMERATED {n2, n4}
OPTIONAL                                NULL,
        },
        cri-RI-CQI
        cri-RSRP                            NULL,
        ssb-Index-RSRP                      NULL,
        cri-RI-LI-PMI-CQI                   NULL
    },
``` the UE measures CSI based on configuration information related to the CSI (S120).

Measuring the CSI may include (1) receiving a CSI-RS by the UE (S121) and (2) computing CSI based on the received CSI-RS (S122), a detailed description thereof described later.

resource element (RE) mapping of CSI-RS resources of the CSI-RS is performed in time and frequency domains by higher layer parameter CSI-RS-ResourceMapping.

Table 7 shows an example of CSI-RS-ResourceMapping IE.

TABLE 7

```
-- ASN1START
-- TAG-CSI-RS-RESOURCEMAPPING-START
CSI-RS-ResourceMapping ::=          SEQUENCE
    frequencyDomainAllocation       CHOICE {
        row1                            BIT STRING ( SIZE (4)),
        row2                            BIT STRING (SIZE (12)),
        row4                            BIT STRING (SIZE (3)),
        other                           BIT STRING (SIZE (6))
    },
    nrofPorts                       ENUMERATED {p1,p2,p4,p8,p12,p16,p24,p32},
    firstOFDMSymbolInTimeDomain     INTEGER (0..13),
    firstOFDMSymbol InTimeDomain2   INTEGER (2..12)
    cdm-Type                        ENUMERATED (noCDM, fd-CDM2, cdm4-FD2-TD2, cdm8-
FD2-TD4},
    density                         CHOICE {
        dot5                            ENUMERATED {evenPRBs, oddPRBs},
        one                             NULL,
        three                           NULL,
        spare                           NULL
    },
    freqBand                        CSI-FrequencyOccupation,
    ...
}
```

In Table 7, a density (D) indicates a density of CSI-RS resources measured in a RE/port/physical resource block (PRB), and nrofPorts indicates the number of antenna ports.

The UE reports the measured CSI to the base station (S130).

Herein, when a quantity of CSI-ReportConfig in Table 7 is set to "none (or No report)", the UE may skip the reporting.

However, even when the quantity is set to "none (or No report)", the UE may report the measured CSI to the base station.

The case in which the quantity is set to "none" is t when an aperiodic TRS is triggered or when repetition is set.

Herein, it may be defined such that reporting by the UE is omitted only when repetition is set to "ON".

CSI Measurement

The NR system supports more flexible and dynamic CSI measurement and reporting. The CSI measurement may include receiving a CSI-RS, and acquiring CSI by computing the received CSI-RS.

As time domain behaviors of CSI measurement and reporting, aperiodic/semi-persistent/periodic channel measurement (CM) and interference measurement (IM) are supported. To configure CSI-IM, four port NZP CSI-RS RE patterns are used.

CSI-IM-based IMR of NR has a design similar to CSI-IM of LTE and is configured independent of ZP CSI-RS resources for PDSCH rate matching. In addition, each port in the NZP CSI-RS-based IMR emulates an interference layer having (a desirable channel and) a pre-coded NZP CSI-RS. This is about intra-cell interference measurement of a multi-user case, and it primarily targets MU interference.

At each port of the configured NZP CSI-RS-based IMR, the base station transmits the pre-coded NZP CSI-RS to the UE.

The UE assumes a channel/interference layer for each port in a resource set, and measures interference.

If there is no PMI or RI feedback for a channel, a plurality of resources are configured in a set and the base station or network indicates, through DCI, a subset of NZP CSI-RS resources for channel/interference measurement.

Resource setting and resource setting configuration will be described in more detail.

Resource Setting

Each CSI resource setting "CSI-ResourceConfig" includes configuration of S≥1 CSI resource set (which is given by higher layer parameter "csi-RS-ResourceSetList"). Herein, a CSI resource setting corresponds to CSI-RS-resourcesetlist. Herein, S represents the number of configured CSI-RS resource sets. Herein, configuration of S≥1 CSI resource set includes each CSI resource set including CSI-RS resources (including NZP CSI-RS or CSI-IM), and a SS/PBCH block (SSB) resource used for L1-RSRP computation.

Each CSI resource setting is positioned at a DL bandwidth part (BWP) identified by higher layer parameter bwp-id. In addition, all CSI resource settings linked to a CSI reporting setting have the same DL BWP.

In a CSI resource setting included in CSI-ResourceConfig IE, a time domain behavior of a CSI-RS resource may be indicated by higher layer parameter resourceType and may be configured to be aperiodic, periodic, or semi-persistent. The number S of CSI-RS resource sets configured for periodic and semi-persistent CSI resource settings is restricted to "1". A periodicity and a slot offset configured for periodic and semi-persistent CSI resource settings are given from a numerology of related DL BWP, just like being given by bwp-id.

When the UE is configured with a plurality of CSI-ResourceConfig including the same NZP CSI-RS resource ID, the same time domain behavior is configured for the CSI-ResourceConFIG.

When the UE is configured with a plurality of CSI-ResourceConfig having the same CSI-IM resource ID, the same time domain behavior is configured for the CSI-ResourceConFIG.

Then, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, CMR (channel measurement resource) may be the NZP CSI-RS for CSI acquisition, and IMR (Interference measurement resource) may be NZP CSI-RS for CSI-IM and IM.

Here, CSI-IM (or ZP CSI-RS for IMS) is used mainly for inter-cell interference measurement.

The NZP CSI-RS for IM is used mainly for intra-cell interference measurement from multiple users.

The UE may assume that a CSI-RS resource(s) and a CSI-IM/NZP CSI-RS resource(s) for interference measurement configured for one CSI reporting is "QCL-TypeD" for each resource.

Resource Setting Configuration

As described above, a resource setting may represent a resource set list.

Regarding aperiodic CSI, each trigger state configured using higher layer parameter "CSI-AperiodicTriggerState" is that each CSI-ReportConfig is associated with one or multiple CSI-ReportConfig linked to a periodic, semi-persistent, or aperiodic resource setting.

One reporting setting may be connected to three resource settings at maximum.

When one resource setting is configured, a resource setting (given by higher layer parameter resources-ForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

Regarding semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, the first resource setting (given by resourcesForChannelMeasurement) is for channel measurement, and the second resource setting (given by the higher layer parameter "csi-IM-ResourcesForInterference") is used for inter-ference measurement performed on CSI-IM.

CSI Computation

If interference measurement is performed on CSI-IM, each CSI-RS resource for channel measurement is associated with a CSI-RS resource in a corresponding resource set by an order of CSI-RS resources and CSI-IM resources.

When interference measurement is performed in NZP CSI-RS, the UE does not expect that more than 1 NZP CSI-RS resource is configured in the resource set associated with the resource setting for channel measurement.

A UE configured with the higher layer parameter 'nzp-CSI-RS-ResourcesForinterference' may expect 18 or less NZP CSI-RS ports in the NZP CSI-RS resource set.

For CSI measurement, the UE assumes the following.

Each NZP CSI-RS port configured for interference measurement corresponds to an interference transport layer.

All interference transport layers of the NZP CSI-RS port for interference measurement consider the EPRE (energy per resource element) ratio.

NZP CSI-RS resource for channel measurement, NZP CSI-RS resource for interference measurement or other interference signals on RE(s) of CSI-IM resource for interference measurement CSI Reporting For CSI reporting, time and frequency resources available for a UE are controlled by a base station.

CSI may include at least one of channel quality indicator (CQI), a precoding matrix indicator (PMI), a CSI-RS resource indicator (CRI), am SS/PBCH block resource indicator (SSBRI), a layer indicator (LI), a rank indicator (RI), or L1-RSRP.

Regarding the CQI, the PMI, the CRI, the SSBRI, the LI, the RI, and the L1-RSRP, the UE may be configured with N≥1 CSI-ReportConfig reporting setting, M≥1 CSI-ResourceConfig resource setting, and a list of one or two trigger states (provided by aperiodicTriggerStateList and semiPersistentOnPUSCH-TriggerStateList) by a higher layer. In the aperiodicTriggerStateList, each trigger state includes a channel and a list of associated CSI-ReportConfigs selectively indicative of Resource set IDs for interference. In the semiPersistentOnPUSCH-TriggerStateList, each trigger state includes one associated CSI-ReportCon-FIG.

In addition, a time domain behavior of CSI reporting supports periodic, semi-persistent, and aperiodic CSI reporting.

The periodic CSI presorting is performed on a short PUCCH and a long PUCCH. A periodicity and a slot offset of the periodic CSI reporting may be configured by RRC and refer to CSI-ReportConfig IE.

SP CSI reporting is performed on a short PUCCH, a long PUCCH, or a PUSCH.

In the case of SP CSI on a short/long PUCCH, a periodicity and a slot offset are configured by RRC, and CSI reporting to an additional MAC CE is activated/deactivated In the case of SP CSI on a PUSCH, a periodicity of SP CSI reporting is configured by RRC, but a slot offset thereof is not configured by RRC and SP CSI reporting is activated/deactivated by DCI (format 0_1).

The first CSI reporting timing follows a PUSCH time domain allocation value indicated by DCI, and subsequent CSI reporting timing follows a periodicity which is configured by RRC. For SP CSI reporting on a PUSCH, a separated RNTI (SP-CSI C-RNTI) is used.

DCI format 0_1 may include a CSI request field and activate/deactivate a specific configured SP-CSI trigger state. In addition, SP CSI reporting is activated/deactivated identically or similarly to a mechanism having data transmission on a SPS PUSCH.

aperiodic CSI reporting is performed on a PUSCH and triggered by DCI. In this case, information related to the trigger of aperiodic CSI reporting may be transferred/indicated/configured through MAC-CE.

In the case of AP CSI having an AP CSI-RS, an AP CSI-RS timing is configured by RRC. Herein, a timing of AP CSI reporting is dynamically controlled by DCI.

A reporting method (e.g., transmitting in order of RI, WB, PMI/CQI, and SB PMI/CQI) by which CSI is divided and reported in a plurality of reporting instances, the method which is applied for PUCCH-based CSI reporting in LTE, is not applied in NR. Instead, NR restricts configuring specific CSI reporting on a short/long PUCCH, and a CSI omission rule is defined. Regarding an AP CSI reporting timing, PUSCH symbol/slot location is dynamically indicated by DCI. In addition, candidate slot offsets are configured by RRC. Regarding CSI reporting, a slot offset(Y) is configured for each reporting setting. Regarding UL-SCH, a slot offset K2 is configured separately.

Two CSI latency classes (low latency class and high latency class) are defined in terms of CSI computation complexity. The low latency CSI is WB CSI that includes up to 4-ports Type-I codebook or up to 4-ports non-PMI feedback CSI. The high latency CSI is a CSI other than the low latency CSI. Regarding a normal UE, (Z, Z') is defined in a unit of OFDM symbols. Z represents the minimum CSI processing time after receiving CSI triggering DCI and before performing CSI reporting. Z' represents the minimum CSI processing time after receiving CSI-RS about a channel/interference and before performing CSI reporting.

Additionally, the UE reports the number of CSI which may be calculated at the same time.

Reporting Configurations

The UE may need to calculate CSI parameters (if reported) assuming the following dependencies between CSI parameters (if reported).

LI shall be calculated subject to reported CQI, PMI, RI and CRI.

The CQI shall be calculated subject to the reported PMI, RI and CRI.

The PMI shall be calculated subject to the reported RI and CRI.

The RI shall be calculated subject to the reported CRI.

A reporting configuration for CSI may be aperiodic (using PUSCH), periodic (using PUCCH), or semi-persistent (using PUCCH and DCI-activated PUSCH). The CSI-RS resource may be periodic, semi-persistent or aperiodic. Table 8 shows supported combinations of CSI reporting configuration and CSI-RS resource configuration, and how CSI reporting is triggered for each CSI-RS resource configuration. The periodic CSI-RS may be set by a higher layer. The semi-persistent CSI-RS may be activated and deactivated as described in a predefined specification (e.g., 3GPP TS 38.214, Section 5.2.1.5.2). Aperiodic CSI-RS may be configured and triggered/activated as described in a predefined specification (e.g., 3GPP TS 38.214, Section 5.2.1.5.1).

TABLE 8

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

Activation/Deactivation of Semi-Persistent CSI-RS/CSI-IM Resource Set

A network (or base station) may transmit an SP CSI-RS/CSI-IM resource set activation/deactivation MAC CE described in a predefined standard (e.g., 3GPP TS38.321, section 6.1.3.12) to activate and deactivate the configured semi-persistent CSI-RS/CSI-IM resource set of the serving cell. The configured semi-persistent CSI-RS/CSI-IM resource set may be deactivated for the first time during setup and after handover.

A MAC entity may need to perform the following.

When the MAC entity receives the SP CSI-RS/CSI-IM resource set activation/deactivation MAC CE from the serving cell:

Information on SP CSI-RS/CSI-IM Resource Set activation/deactivation MAC CE may need to be indicated to a lower layer.

Aperiodic CSI Trigger State Subselection

The network (or base station) may transmit an aperiodic CSI trigger state subselection MAC CE described in a predefined standard (e.g., 3GPP TS38.321 section 6.1.3.13) to select a set aperiodic CSI trigger state of the serving cell.

A MAC entity may need to perform the following:

When the MAC entity receives aperiodic CSI trigger state subselection MAC CE from the serving cell:

Information on aperiodic CSI state state subselection MAC CE may need to be indicated to a lower layer.

Multi-TRP (Transmission/Reception Point) Related Operation

The CoMP (Coordinated Multi Point) technique refers to a method of effectively controlling interference by cooperatively transmitting a terminal by exchanging (using e.g., X2 interface) or utilizing the channel information (e.g., RI/CQI/PMI/LI, etc.) fed back from the terminal. Depending on a method used, it may be divided into joint transmission (JT), coordinated scheduling (CS), coordinated beamforming (CB), DPS (dynamic point selection), and DPB (dynamic point blacking).

M-TRP (Multiple TRP) Transmission

The M-TRP transmission method, in which M TRPs transmit data to one user equipment (UE), may be divided into two types of an eMBB M-TRP transmission as a method for increasing a transfer rate and a URLLCM-TRP as a method for increasing a reception success rate and reducing latency.

In addition, from the viewpoint of DCI (downlink control information) transmission, the M-TRP (multiple TRP) transmission method may be divided into i) M-DCI (multiple DCI) based M-TRP transmission in which each TRP transmits a different DCI, and ii) an S-DCI (single DCI) based M-TRP transmission method in which one TRP transmits DCI. For example, in the case of S-DCI, since all scheduling information for data transmitted by M-TRP should be transmitted through one DCI, it may be used in an ideal BH (ideal backhaul) environment in which two TRPs may be dynamically cooperated.

Scheme 3/4 is under discussion for standardization in TDM based URLLC.

Specifically, scheme 4 refers to a method in which one TRP transmits a TB in one slot, and has the effect of increasing a data reception probability through the same TB received from several TRPs in several slots. In contrast, Scheme 3 refers to a method in which one TRP transmits a TB through several consecutive OFDM symbols (that is, a symbol group), and may be set such that multiple TRPs transmit the same TB through different symbol groups in one slot.

In addition, the UE may recognize a PUSCH (or PUCCH) scheduled by DCI received in different CORESETs (or CORESETs belonging to different CORESET groups) as a PUSCH (or PUCCH) transmitted to different TRPs or PUSCHs (or PUCCHs) of different TRPs. In addition, the method for UL transmission (e.g., PUSCH/PUCCH) transmitted to different TRPs may be equally applied to UL transmission (e.g., PUSCH/PUCCH) transmitted to different panels belonging to the same TRP.

In addition, the MTRP-URLLC may refer to that the M-TRP transmits the same transport block (TB) using different layers/time/frequency. It may be assumed that the UE configured with the MTRP-URLLC transmission method is instructed with several TCI state(s) by DCI and data received using the QCL RS of each TCI state is the same TB. Meanwhile, MTRP-eMBB may refer to that M-TRP transmits different TBs using different layer/time/frequency. It may be assumed that the UE configured with the MTRP-eMBB transmission method is instructed with several TCI state(s) by DCI and data received using a QCL RS of each TCI state are different TBs. In this regard, as the UE separately uses an RNTI configured for the MTRP-URLLC purpose and an RNTI configured for the MTRP-eMBB purpose, the UE may determine whether the corresponding M-TRP transmission is the URLLC transmission or the eMBB transmission. That is, if a CRC masking of the DCI received by the UE is performed using the RNTI set for the MTRP-URLLC purpose, this corresponds to URLLC transmission, and when CRC masking of DCI is performed using an RNTI set for MTRP-eMBB purpose, this may correspond to eMBB transmission.

Hereinafter, a CORESET group ID described/referred to in the present disclosure may refer to an index/identification information (e.g., ID) for identifying the CORESET for each TRP/panel. In addition, the CORESET group may be a group/union of CORESETs identified by an index/identification information (e.g., ID)/the CORESET group ID for identifying a CORESET for each TRP/panel. For example, the CORESET group ID may be specific index information defined in the CORSET configuration. For example, the CORESET group may be set/indicated/defined by an index defined in the CORESET configuration for each CORESET.

Also/alternatively, a CORESET group ID may refer to an index/identification information/indicator for classification/identification between CORESETs set/related to each TRP/panel, and the CORESET group ID described/referred in the present disclosure is may be expressed by being replaced with a specific index/specific identification information/specific indicator for classification/identification between CORESETs set/related to each TRP/panel. The CORESET group ID (i.e., a specific index/specific identification information/specific indicator for classification/identification between CORESETs set/associated to each TRP/panel) may be configured/indicated higher layer signaling (e.g., RRC signaling)/L2 signaling (e.g., MAC-CE)/L1 signaling (e.g., DCI).

As an example, it may be set/instructed to perform PDCCH detection for each TRP/panel in a corresponding CORESET group unit, and/or uplink control information (e.g., CSI, HARQ-A/N, SR) and/or uplink physical channel resources (e.g., PUCCH/PRACH/SRS resources) may be set/instructed to be managed/controlled separately for each TRP/panel in a corresponding CORESET group unit, and/or HARQ A/N (process/retransmission) for PDSCH/PUSCH, etc. which are scheduled separately for each TRP/panel may be managed for each TRP/panel in the corresponding CORESET group unit.

For example, a higher layer parameter, ControlResourceSet information element (IE), is used to set a time/frequency control resource set (CORESET). For example, the control resource set (CORESET) may be related to detection and reception of downlink control information. The ControlResourceSet IE may include CORESET-related ID (e.g., controlResourceSetID)/index of CORESET pool for CORESET (e.g., CORESETPoolIndex)/time/frequency resource setting of CORESET/TCI information related to CORESET. As an example, the index of the CORESET pool (e.g., CORESETPoolIndex) may be set to 0 or 1. In the above description, a CORESET group may correspond to a CORESET pool, and a CORESET group ID may correspond to a CORESET pool index (e.g., CORESETPoolIndex).

Description of Multiple DCI Based NCJT/Single DCI Based NCJT

NCJT (Non-coherent joint transmission) is a method in which multiple TPs (Transmission Points) transmit data to one UE (User Equipment) using the same time frequency, and the TPs transmit data in different layers using different DMRS(Demodulation Multiplexing Reference Signal) ports. The TP transmit data scheduling information to a terminal receiving the NCJT as downlink control information (DCI). At this time, a method in which each TP participating in the NCJT transmits the scheduling information for the data it transmits by the DCI is called multi DCI based NCJT. Since the N TPs participating in NCJT transmission each transmit DL grant DCI and PDSCH to the UE, the UE receives N DCIs and N PDSCHs from the N TPs.

In contrast, a method in which one representative TP transmits scheduling information for data transmitted by itself and data transmitted by another TP by one DCI is called single DCI based NCJT. In this case, N TPs transmit one PDSCH, but each TP transmits only some of multiple layers constituting one PDSCH. For example, when 4 layer data is transmitted, TP 1 transmits 2 layers and TP 2 transmits the remaining 2 layers to the UE.

Description of partially overlapped NCJT

In addition, the NCJT is divided into a fully overlapped NCJT in which the time frequency resources transmitted by each TP completely overlap and a partially overlapped NCJT in which only some time frequency resources overlap. That is, in the case of partially overlapped NCJT, in some time frequency resources, both transmission data of TP 1 and TP2 are transmitted, and in remaining time frequency resources, only one TP of TP 1 or TP 2 transmits data.

Reliability Improvement Method in Multi-TRP

Two methods may be considered as a transmission/reception method for improving reliability using transmission in multiple TRPs.

The example of (a) of FIG. 9 shows a case in which a layer group transmitting the same CW (codeword)/TB corresponds to different TRPs. In this case, the layer group may refer to a certain kind of layer set including one or more layers. In this case, the amount of transmission resources increases due to the number of layers, and there is an advantage that robust channel coding with a low code rate may be used for TB (transport block), and in addition, since channels from multiple TRPs are different, the reliability of the received signal may be expected to be improved based on a diversity gain.

Meanwhile, the example of (b) of FIG. 9 shows an example of transmitting different CWs through layer groups corresponding to different TRPs. In this case, it may be assumed that TBs corresponding to CW #1 and CW #2 in the figure are the same. Therefore, it may be considered as an example of repeated transmission of the same TB. The case of (b) of FIG. 9 may have a disadvantage that the coding rate corresponding to the TB is higher than the example of (a) of FIG. 9. However, according to a channel environment, it has the advantage that a coding rate or a modulation order of each CW may be adjusted by indicating different RV (redundancy version) values for encoding bits generated from the same TB.

In (a) and (b) of FIG. 9, as the same TB is repeatedly transmitted through different layer groups and each layer group is transmitted by a different TRP/panel, the data reception probability may be increased, which is named as an SDM based M-TRP URLLC transmission method. Layers belonging to different layer groups are transmitted through DMRS ports belonging to different DMRS CDM groups, respectively.

In addition, although the aforementioned multiple TRP-related contents are described based on a spatial division multiplexing (SDM) scheme using different layers, this may also be extendedly applied to a frequency division (FDM) based on different frequency domain resources (e.g., RB/PRB (set)) and/or a time division multiplexing (TDM) method based on a multiplexing) method based on different time domain resource scheme (e.g., slot, symbol, sub-symbol).

When the UE reports multi-TRP CSI (MTRP CSI) to a base station (BS), a configuration for a report value may be defined as follows. For example, whether the report value is configured as Option 1 (e.g., Mode1) or as Option 2 (e.g., Mode2) may be set/indicated by a higher layer parameter (e.g., csi-ReportMode).

(1) Option 1: Both MTRP CSI and STRP CSI

For example, in the case of Option 1, the report value may include both MTRP CSI and STRP CSI. Option 1 may increase a scheduling freedom of the base station, but a feedback overhead increases.

(2) Option 2: Either MTRP CSI or STRP CSI

For example, in the case of Option 2, the report value may include MTRP CSI or STRP CSI. Option 2 may reduce feedback overhead, but since the UE may report only preferred CSI, the base station cannot know CSI for the other hypothesis. In addition, in the case of Option 2, feedback overhead may be variable.

In the case of Option 1, a case in which a scheduling freedom of the base station may be increased is when different multi-user transmission (MU) interference conditions are assumed for each STRP CSI hypothesis estimated by the UE. The situation in which the scheduling freedom of the base station may be increased is a case in which MTRP CSI is excellent in a single user transmission (SU) situation, but STRP CSI is excellent in an MU situation, and here, the US cannot determine an overall performance for the MU situation and the BS may determine the overall performance based on CSIs reported by multiple UEs that may be included in the MU situation.

Therefore, from the viewpoint of the UE for the above purpose, it should be able to report channel state information (CSI) reflecting MU interference when reporting STRP CSI. At this time, the MU situation may be different depending on the TRP, and different MU interference should be reflected according to the STRP CSI hypothesis that the UE should estimate.

FIG. 10 shows an example of assumptions of a channel measurement resource (CMR) and an interference measurement resource (IMR) in each hypothesis assumption. Specifically, (a) of FIG. 10 shows a CMR setting for the MTRP CSI hypothesis, (b) of FIG. 10 shows a CMR/IMR (NZP CSI-RS) setting for the STRP CSI hypothesis 1, and (c) of FIG. 10 shows a STRP CMR/IMR (NZP CSI-RS) setting for CSI hypothesis 2.

Referring to FIG. 10, it can be seen that IMR0 for an MU situation of TRP #1 and IMR1 for an MU situation of TRP #2 are different from each other.

Based on the above motivation, IMR based on different NZP (non-zero power) CSI-RS (reference signal) may be set for each CMR, but, in the current standard, when configuring IMR based on NZP CSI-RS, only a single CMR may be sets (in case of not reporting L1-SINR)

Therefore, a method of setting a plurality of NZP CSI-RS IMRs and CMRs and a method of establishing a mapping relationship between NZP CSI-RS IMRs and CMRs in such a situation should be defined. Additionally, when configuring IMR based on CSI-IM, a method of establishing a mapping relationship between CMR/CSI-IM based IMR/NZP CSI-RS based IMR should also be defined. For example, a method for establishing a matching relationship between CMR and IMR should be defined. Alternatively, a method of establishing a mapping relationship between CMR and CSI-IM (interference measurement) based IMR and/or NZP CSI-RS based IMR should also be defined.

In the present disclosure, based on the NZP CSI-RS (or CMR) for CM set in the reporting setting related to the CSI report corresponding to multi-TRP transmission, a method that may set combinations (or MTRP CSI hypotheses) including multiple CMRs and a method of establishing a mapping relationship between CMR/CSI-IM based IMR/NZP CSI-RS based IMR for the specific reporting setting (hereinafter, the first embodiment) is proposed.

In addition, the present disclosure proposes a method for setting/indicating a port combination for each RI (hereinafter, a second embodiment) and a method for the UE to distinguish between a CMR corresponding to the STRP CSI and a CMR corresponding to the MTRP CSI.

Hereinafter, the embodiments described in the present disclosure are only divided for convenience of description, and some methods and/or some configurations of an embodiment may be substituted with the methods and/or configurations of other embodiments or may be applied in combination.

Described as 'hypothesis' in the present disclosure may be for convenience of description. And/or, one CSI hypothesis may refer to a unit in which the UE assumes CMR and IMR for CSI calculation. For example, a single TRP CSI hypothesis may refer to a combination of a specific CMR/a specific NZP IMR(s)/a specific ZP IMR(s) (and/or a CSI that may be calculated/reported based on the combination). And/or, one multi-TRP CSI hypothesis may refer to a specific CMR combination/a specific NZP IMR(s)/a combination of specific ZP IMR(s) (and/or a CSI that may be calculated/reported based on the combination). For example, in the present disclosure, the (multi-TRP) CSI hypothesis or CMR combination may be referred to as a resource pair. And/or, in the present disclosure, a (multi-TRP) CSI hypothesis including two CMRs or a combination of two CMRs may be referred to as a resource pair. For example, a CSI hypothesis including the first CMR and the second CMR or a combination of the first CMR and the second CMR may be referred to as a resource pair.

In the present disclosure, CMR may refer to NZP CSI-RS (resource) for CM, and/or IMR may refer to NZP CSI-RS (resource) for IM and/or CSI-IM (resource) for IM.

In the present disclosure, for convenience of description, it is assumed that two TRPs (e.g., TRP1/TRP2) operate. However, this assumption does not limit the technical scope of the present disclosure.

It is obvious that TRP is described in the present disclosure may be for convenience of description and may also be interpreted in terms such as panel/beam.

A slot, a subframe, a frame, etc. mentioned in the embodiments described in the present disclosure may correspond to specific examples of certain time units used in a wireless communication system. That is, in applying the methods proposed in the present disclosure, a time unit may be replaced with other time units applied in other wireless communication systems to be applied.

In the present disclosure, L1 signaling may refer to DCI-based dynamic signaling between a base station and a terminal, and L2 signaling may refer to higher layer signaling based on a radio resource control (RRC)/media access control-control element (MAC-CE) between a base station and a terminal.

The above contents (3GPP system, frame structure, NR system, etc.) may be applied in combination with the methods proposed in the present disclosure to be described later, and/or may be supplemented to clarify the technical features of the methods proposed in the present disclosure.

In the present disclosure, '( )' may be interpreted as both the case of excluding the contents in ( ) and the case of including the contents in the parentheses. And/or '( )' in the present disclosure may refer to a group of elements (or, contents) in parentheses, may refer to an abbreviation/full name of the term in front of the parentheses, and/or may be the English description of the contents before the parentheses.

In the present disclosure, '/' may be interpreted as both a case of including (and) all of the contents separated by / and a case of including (or) only part of the separated contents.

First Embodiment

In this embodiment, a method of setting combinations (or MTRP CSI hypothesis) including multiple CMRs based on NZP CSI-RS (or CMR) for CM set in a reporting setting related to a CSI report corresponding to the multi-TRP transmission will be described.

The methods described below are only divided for convenience of description, and a configuration of one method may be substituted with a configuration of another method or may be applied in combination with each other. And/or, in the proposed method of the first embodiment, contents of the CSI-related operation and multi-TRP-related operation described above may be referred to.

Based on the NZP CSI-RS (or CMR) for CM set in a specific reporting setting, combinations (or MTRP CSI hypothesis) including multiple CMRs may be configured for the UE. For each CMR combination, the CSI-IM may be configured to have a one-to-one mapping relationship for each combination. For example, the reporting setting may be the CSI-ReportConfig IE of Table 6.

As an (implicit) method for configuring the 'MTRP CSI hypothesis', the following method may be applied. For a specific NZP CSI-RS resource set (for CM/IM) set in the 'specific reporting setting', the MTRP CSI hypothesis may be defined based on different resources or a resource set transmitted in the same symbol(s)/slot among NZP CSI-RS resources in the resource set. For example, the first CMR and the second CMR are configured in the same slot, and the UE may calculate/report CSI based on the first CMR and the second CMR.

FIG. 11 shows an example of defining the MTRP CSI hypothesis based on different combinations of resources transmitted in the same symbol(s) and/or the same slot. For example, in (a)/(b) of FIG. 11, CMR0/CMR1/CMR2/CMR3 may each be set/included/configured as CDM group 0 and CDM group 1.

In the example of (a) of FIG. 11, the combination of CMR0/1 and CMR2/3 transmitted in the same symbol(s) may constitute the MTRP CSI hypothesis, respectively. For example, CMR0/1 for MTRP CSI hypothesis 0 and CMR2/3 for MTRP CSI hypothesis 1 may be configured.

In the example of (b) of FIG. 11, a combination of CMR0/2 and CMR1/3 transmitted in the same slot may constitute each MTRP CSI hypothesis. For example, CMR0/2 for MTRP CSI hypothesis 0 and CMR1/3 for MTRP CSI hypothesis 1 may be configured.

If n CMRs are transmitted in the same symbol(s)/slot and the number of CMRs of the CMR combination constituting a single MTRP CSI hypothesis is m at most, nC2+nC3 . . . +nCm MTRP CSI hypothesis may be performed for symbol(s)/slot where n CMRs are transmitted.

In the proposed method of the present disclosure, it is required to set different CMRs that may be simultaneously received by the UE for different resources constituting the MTRP CSI hypothesis, so that the different resources may overlap in the time domain or set in the same symbol(s)/slot, thereby eliminating a time-varying effect that may occur in different CMRs and reducing the time required to receive the entire NZP CSI-RS resource for CSI calculation.

And/or, the proposed method of the present disclosure may be more meaningful in an environment (e.g., FR2) in which a QCL reference signal (RS) for a reception beam of a terminal may be configured/indicated. This is because the base station needs to properly match a reception timing of the CMR combination according to how many beams the terminal may receive simultaneously. For example, when it is assumed that the UE simultaneously receives two beams at the same time, if CMR0/1 is assumed/set as one MTRP CSI hypothesis, CMR0 should be received as both QCL (quasi co-location)-TypeD RS (e.g., RS #A) set in the CMR0 and QCL-TypeD RS (e.g., RS #B) set in CMR1 set in CMR0 for calculating the corresponding MTRP CSI. If CMR0 overlaps another CMR (e.g., CMR2 (e.g., QCL-TypeD RS (e.g., RS #C))) other than CMR1 in the time domain, a problem that the UE may need to receive three beams corresponding to RS #A, RS #B, and RS #C, at the corresponding time may arise.

Therefore, the proposed method may be applied to prevent this problem and increase the efficiency of resource utilization between different CMRs. And/or, in order to prevent the aforementioned problematic situation, the terminal may assume the following method for scheduling of the base station.

For a CMR combination corresponding to the MTRP CSI hypothesis, when different QCL-TypeD reference RSs are set for each CMR corresponding to the corresponding CMR combination, the UE may assume that the resource/channel/signal in which the RS other than the QCL-TypeD reference RS is set is not transmitted in the same symbol(s) as the CMR of the CMR combination. Here, the QCL-TypeD reference RS may refer to a reference signal for QCL-TypeD in the TCI state. For example, when the (specific) CMR is set to the (specific) QCL-Type reference RS, the UE may use/apply a reception beam used for reception of the QCL-Type reference RS for the reception of CMR or CSI-RS corresponding to CMR.

For example, in the case of CMR0(RS #A)/CMR1(RS #B) for MTRP CSI hypothesis 0, it may be assumed that, in the symbol(s) where CMR0/CMR1 is transmitted, resource/channel/signal for which QCL-TypeD RS (e.g., RS #C) other than RS #A/#B is set is not transmitted. For example, the resource may be CMR, IMR, and the like. For example, the channel may be a physical downlink shared channel (PDSCH), a physical downlink control channel (PDCCH), or the like. For example, the signal may be a demodulation reference signal (DMRS), CSI-RS, or the like.

When the UE receives CMR0, it should be able to receive it with different beams based on RS #A/#B, and when receiving CMR1, it should also be able to receive it with different beams based on RS #A/#B. Therefore, even when CMR0/CMR1 is received alone, since the two different reception beams are received, the base station may guarantee that another signal that requires another reception beam is not received.

And/or, an example of the 'combination including multiple CMRs' and the CSI-IM corresponding thereto may be set as follows. For example, CMR0/CSI-IM0, CMR1/CSI-IM1, CMR2/CSI-IM2, CMR3/CSI-IM3, MTRP CSI hypothesis1(CMR0/CMR1)/CSI-IM4, MTRP CSI hypothesis2(CMR2/CMR3)/CSI-IM5 may be configured. Here, A/B may refer to a corresponding relationship. For example, CMR0 corresponds to CSI-IM0, CMR1 corresponds to CSI-IM1, CMR2 corresponds to CSI-IM2, CMR3 corresponds to CSI-IM3, MTRP CSI hypothesis1 (CMR0/CMR1) corresponds to CSI-IM4, and MTRP CSI hypothesis2 (CMR2/CMR3) may correspond to CSI-IM5.

Through the proposed method, different CSI-IMs are set for each hypothesis, so that different interference situations may be reflected according to the MTRP CSI hypothesis. For example, MTRP CSI hypothesis1 (e.g., CMR0/CMR1 for channel measurement from TRP0/1)/CSI-IM4 (e.g., CSI-IM for interference measurement from TRP2/3), MTRP CSI hypothesis2 (e.g., CMR2/CMR3)/CSI-IM5 for channel measurement from TRP2/3 (e.g., CSI-IM for measurement of interference from TRP0/1) may be configured. For example, a correspondence (relationship) between MTRP CSI hypothesis 1 and CSI-IM4 and/or a correspondence (relationship) between MTRP CSI hypothesis2 and CSI-IM5 may be established.

And/or, for a CMR combination corresponding to the MTRP CSI hypothesis, different ZP (zero power) IMRs set for the STRP CSI hypothesis corresponding to each CMR may be set/instructed to be used for measuring the interference of the MTRP CSI hypothesis. For example, in a situation of (CMR1, NZP IMR 1, ZP IMR 1) for STRP CSI hypothesis 1 (e.g., TRP1), (CMR2, NZP IMR 2, ZP IMR 2) for STRP CSI hypothesis 2 (e.g., TRP2), when calculating STRP CSI, CMR/IMR is used as set above, and when calculating MTRP CSI for the MTRP CSI hypothesis including the two CMR1/CMR2, it may be set/instructed to use only ZP IMR, excluding NZP IMR. For example, in a situation in which CMR1, NZP IMR 1, and ZP IMR 1 are set for STRP CSI hypothesis 1 (e.g., TRP1) and CMR2, NZP IMR 2, and ZP IMR 2 are set for STRP CSI hypothesis 2 (e.g., TRP2), it may be set/instructed to use CMR/IMR as set above when calculating the STRP CSI, and use only the ZP IMR except for the NZP IMR, when calculating the MTRP CSI for the MTRP CSI hypothesis including the two CMR1/CMR2. And/or, the use of both ZP IMR 1/2 and how to use them may depend on the implementation.

When NZP IMR1 contains MU inter layer interference of TRP1 and inter TRP inter layer interference from TRP2 (NZP IMR2 is the opposite) and ZP IMRI does not have such interferences, when calculating MTRP CSI, MU and CoMP inter TRP interference may be excluded using only ZP IMR and CoMP inter TRP interference may be reflected in CQI by using a synthesis channel of CMR1/2 and PMI 1/2. And/or, when calculating the MTRP CSI, the IMR may be selected and used based on the low index IMR/CMR. For example, the UE may select NZP IMR 1 and ZP IMR 1 corresponding to the low index for MTRP CSI calculation.

The 'specific reporting setting' may refer to a reporting setting configured/instructed to report single TRP CSI and/or multi-TRP CSI. In this case, for the NZP CSI-RS (or CMR) for CM set in the 'specific reporting setting', the NZP CSI-RS (or NZP IMR) for each resource (resource-wise) IM may be set to have a one-to-one mapping relationship.

To this end, for example, the target reportQuantity may be set, and/or a parameter for explicitly indicating the operation may be added. When the QCL-TypeD RS is configured for the CMR, the NZP IMR corresponding to the CMR may be configured to have the same QCL-TypeD RS. When the above proposed method is applied, the current standard supports multiple NZP IMRs only for L1-SINR measurement, and limits the pattern (3REs/RB) and usage (repetition) for the NZP IMR, and in this case, for the NZP IMR corresponding to the report setting for MTRP/STRP CSI reporting, the corresponding limitations are not applied, which is different from the existing method.

Next, before describing the second and third embodiments, the operation of the current standard and the necessity of the second and third embodiments will be first described.

First, a non-PMI based CSI report operation defined in the current standard will be described.

In the current standard, when the UE is set to CSI-ReportConfig with a higher layer parameter reportQuantity set to 'cri-RI-CQI', and, when the terminal is set with a higher layer parameter non-PMI-PortIndication included in the CSI-ReportConfig, r ports are indicated in the layer order for rank r, and in the CSI resource setting, each CSI-RS resource may be linked to the CSI-ReportConfig based on the order of the associated NZP-CSI-RS-ResourceId of the CSI resource setting linked for channel measurement provided by resourcesForChannelMeasurement that is a higher layer parameter. The configured higher layer parameter non-PMI-PortIndication may include a sequence of port indexes $p_0^{(1)}, p_0^{(2)}, p_1^{(2)}, p_0^{(3)}, p_1^{(3)}, p_2^{(3)}, p_2^{(3)}, \ldots, p_0^{(R)}, p_1^{(R)}, \ldots, p_1^{(R)}, \ldots, p_{R-1}^{(R)}$. Here, $p_0^{(v)}, \ldots, p_{v-1}^{(v)}$ may be CSI-RS port indexes associated with rank v and R∈{1, 2, ..., P}. P∈{1, 2,4,8} may be the number of ports of the CSI-RS resource. The UE may have to report only the RI corresponding to the set field of PortIndexFor8Ranks.

Also, if the terminal is not set to the higher layer parameter non-PMI-PortIndication, the terminal may assume that, for each CSI-RS resource of the CSI resource setting connected to CSI-ReportConfig, CSI-RS port indexes $p_0^{(v)}, \ldots, p_{v-1}^{(v)} = \{0, \ldots, v-1\}$ are associated with ranks v=1, 2, ..., P. Here, P∈{1,2,4,8} may be the number of ports of the CSI-RS resource.

When calculating the CQI for the rank, the UE may have to use the ports indicated for the corresponding rank for the selected CSI-RS resource. Precoders for the indicated ports may have to be assumed to be an identity matrix scaled by $$\frac{1}{\sqrt{v}}.$$

Environments and purposes that may utilize non-PMI based CSI report (e.g., when reportQuantity is set to 'cri-RI-CQI') are as follows. In an environment in which DL/UL channel reciprocity is established (e.g., time division duplex (TDD)) so that a base station may estimate a downlink (DL) channel based on an uplink (UL) signal/channel/resource, a DL precoding matrix may be determined based on the DL channel estimated by the base station, but since the base station cannot know the reception capability (e.g., receiver type/UE implementation, etc.)/SNR/interference situation (e.g., SINR) of the terminal, such influence may be reflected so that it may be used for receiving reports of CSI-RS resource indicator (CRI)/rank indicator (RI)/channel quality information (CQI) preferred by the UE.

In the case of using non-PMI based CSI report for multi/single-TRP CSI (MTRP/STRP CSI) calculation/obtaining/reporting, the following two methods may be considered.

Option 1: A Method of Calculating/Obtaining/Reporting STRP CSI Based on a Single CMR and Calculating/Obtaining/Reporting MTRP CSI Based on a Combination of the CMRs For example, when CMR0/1 is configured in the terminal, different STRP CSI corresponding to each of CMR0 and CMR1 may be calculated, and MTRP CSI may be calculated based on the CMR0/CMR1 combination.

(2) Option 2: A Method of Defining Each of CMR for STRP CSI Calculation/Obtaining/Reporting and CMR for MTRP CSI Calculation/Obtaining/Reporting For example, when CMR0/1 is configured in the UE, STRP CSI may be calculated based on CMR0, and MTRP CSI may be calculated based on CMR1.

FIG. 12 shows an example for Option 1, and FIG. 13 shows an example for Option 2.

(a) of FIG. 12 shows an example of transmitting a CSI-RS in the CMR0 to the UE by applying precoding matrix $w_1$ most preferred in terms of the single TRP transmission, after estimating DL channel $H_1$ based on UL signal/channel/resource in TRP #1. And/or, (b) of FIG. 12 shows an example of transmitting CSI-RS in CMR1 to the UE by applying precoding matrix $w_2$ most preferred in terms of the single TRP transmission after estimating DL channel $H_2$ based on UL signal/channel/resource in the TRP #2. In the case of the example of FIG. 12, when the UE calculates MTRP CSI based on the CMR combination (e.g., CMR0/1 combination), the MTRP CSI may be calculated based on precoding matrix $w_1$, $w_2$ selected on the assumption of single TRP transmission. Therefore, the Option 1 method may have a disadvantage that the precoding matrix cannot be optimized for MTRP CSI.

(a) of FIG. 13 shows an example of transmitting CSI-RS in CMR0 to the UE by applying precoding matrix $w_{1,STRP}$ most preferred in terms of single TRP transmission after estimating DL channel $H_1$ based on UL signal/channel/resource in TRP #1. And/or, (b) of FIG. 13 shows an example of transmitting CSI-RS in CMR1 to the UE by applying precoding matrix $w_{2,STRP}$ most preferred in terms of single TRP transmission after estimating DL channel $H_2$ based on UL signal/channel/resource in TRP #2. And/or, (c) of FIG. 13 shows an example of transmitting CSI-RS in CMR2 to the UE by applying precoding matrix $w_{1,MTRP}$ and $w_{2,MTRP}$ most preferred in terms of multi-TRP transmission based on DL channel $H_1$ and $H_2$ estimated in TRP #1 and TRP #2. The example of FIG. 13 may have an advantage in that the UE may be able to calculate CSI based on the CSI-RS in which different precoding matrices preferred for single TRP transmission and multi-TRP transmission are reflected.

In the case of Option 1, a CMR combination optimized for MTRP CSI may be additionally transmitted to the UE in order to compensate for the above-mentioned disadvantages. This method is called Option1-1. FIG. 14 shows an example for Option 1-1.

(a) of FIG. 14 shows an example of transmitting CSI-RS in CMR0 to the UE by applying precoding matrix $w_{1,STRP}$ most preferred in terms of single TRP transmission after estimating DL channel $H_1$ based on UL signal/channel/resource in TRP #1.

And/or (b) of FIG. 14 shows an example of transmitting CSI-RS in CMR1 to the UE by applying precoding matrix $w_{2,STRP}$ most preferred in terms of single TRP transmission after estimating DL channel $H_2$ based on UL signal/channel/resource in TRP #2. And/or, (c) of FIG. 14 shows an example of transmitting CSI-RS in CMR2 to the UE by applying precoding matrix $w_{1,MTRP}$ most preferred in terms of multi-TRP transmission based on DL channel $H_1$ estimated in TRP #1. And/or, (d) of FIG. 14 shows an example of transmitting CSI-RS in CMR3 to the UE by applying precoding matrix $w_{2,MTRP}$ most preferred in terms of multi-TRP transmission based on DL channel $H_2$ estimated in TRP #2. In the case of the example of FIG. 14, the UE may perform calculation/obtaining/reporting on STRP CSI based on CMR0/1, and calculation/obtaining/reporting on MTRP CSI based on CMR2/3 combination.

Non-PMI-PortIndication may be used for setting a port index to be applied to the CSI calculation by the UE for each RI value that may be defined within the number of ports set in the NZP CSI-RS resource. Assuming Option 1 above, non-PMI-PortIndication may be set for each NZP CSI-RS resource (for CM) in the current standard, and in this case, when MTRP CSI may be calculated/obtained/reported based on the CMR combination, a (separate) setting/indication that may function as the above parameter is required for the CMR combination. Table 9 shows the definition of non-PMI-PortIndication defined in the current standard.

TABLE 9

```
non-PMI-PortIndication              SEQUENCE  (SIZE  (1.maxNrofNZP-CSI-RS-
ResourcesPerConfig)) OF PortIndexFor8Ranks OPTIONAL,   -- Need R
...,
PortIndexFor8Ranks ::=              CHOICE {
portIndex8                          SEQUENCE{
rank1-8                                                              PortIndex8
OPTIONAL,    -- Need R
rank2-8                                     SEQUENCE(SIZE(2)) OF PortIndex8
OPTIONAL,    -- Need R
rank3-8                                     SEQUENCE(SIZE(3)) OF PortIndex8
OPTIONAL,    -- Need R
rank4-8                                     SEQUENCE(SIZE(4)) OF PortIndex8
OPTIONAL,    -- Need R
rank5-8                                     SEQUENCE(SIZE(5)) OF PortIndex8
OPTIONAL,    -- Need R
rank6-8                                     SEQUENCE(SIZE(6)) OF PortIndex8
OPTIONAL,    -- Need R
rank7-8                                     SEQUENCE(SIZE(7)) OF PortIndex8
OPTIONAL,    -- Need R
rank8-8                                     SEQUENCE(SIZE(8)) OF PortIndex8
OPTIONAL,    -- Need R
},
portIndex4                          SEQUENCE{
rank1-4                                                              PortIndex 4
OPTIONAL,    -- Need R
rank2-4                                     SEQUENCE(SIZE(2)) OF PortIndex4
OPTIONAL,    -- Need R
rank3-4                                     SEQUENCE(SIZE(3)) OF PortIndex4
OPTIONAL,    -- Need R
rank4-4                                     SEQUENCE(SIZE(4)) OF PortIndex4
OPTIONAL,    -- Need R
},
portIndex2                          SEQUENCE{
rank1-2                                                              PortIndex2
OPTIONAL,    -- Need R
rank2-2                                     SEQUENCE(SIZE(2)) OF PortIndex2
OPTIONAL,    -- Need R
},
portIndex1                          NULL
},
PortIndex8 ::=                      INTEGER (0.7)
PortIndex4 ::=                      INTEGER (0.3)
PortIndex2 ::=                      INTEGER (0.1)
```

For example, non-PMI-PortIndication may be a port indication for RI/CQI calculation. non-PMI-PortIndication may be a port indication for each rank R indicating the R port to be used for each CSI-RS resource of the ResourceConfig linked for channel measurement. And/or, non-PMI-PortIndication may be applicable only to non-PMI feedback (e.g., see 3GPP TS 38.214, Section 5.2.1.4.2).

For example, a first entry of non-PMI-PortIndication may correspond to the NZP-CSI-RS-Resource indicated by a first entry in nzp-CSI-RS-Resources of NZP-CSI-RS-Resource-Set indicated by the first entry of nzp-CSI-RS-Resource-SetList. Here, CSI-ResourceConfigId may be indicated in CSI-MeasId together with the above CSI-ReportConfigId.

A second entry of Non-PMI-PortIndication may correspond to the NZP-CSI-RS-Resource indicated by the second entry the second in nzp-CSI-RS-Resources of NZP-CSI-RS-ResourceSet indicated by the first entry of nzp-CSI-RS-ResourceSetList of the same CSI-ResourceConfig. Also, it continues up to NZP-CSI-RS-Resource indicated by the last entry of nzp-CSI-RS-Resource in the NZP-CSI-RS-ResourceSet indicated by the first entry of nzp-CSI-RS-ResourceSetList of the same CSI-ResourceConfig.

Also, a next entry may correspond to NZP-CSI-RS-Resource indicated by the first entry in nzp-CSI-RS-Resources of the NZP-CSI-RS-ResourceSet indicated by the second entry of nzp-CSI-RS-ResourceSetList of the same CSI-ResourceConfig, etc.

A port combination for each RI that may be preferred when calculating/obtaining/reporting STRP CSI for a single CMR and a port combination for each RI that may be preferred when calculating/acquiring/reporting MTRP CSI for a CMR combination may be different. For example, when calculating MTRP CSI, inter-CMR (or inter-TRP) interference may occur between different CMRs. Such interference may affect port combinations for each RI. Therefore, when calculation/obtaining/reporting of MTRP CSI is performed for a CMR combination, a method for setting/indicating a port combination for each RI is required.

And/or, assuming the above Option 2, when reporting both STRP CSI and MTRP CSI preferred from the UE's point of view, it is necessary to distinguish between the CMR corresponding to the STRP CSI and the CMR corresponding to the MTRP CSI. For example, as in the example of FIG. 13, when CMR0/1 is configured for STRP CSI purpose and CMR2 is configured for MTRP CSI purpose in the UE, one CMR among CMR0/1 may be reported for STRP CSI purpose, and CMR2 may be reported for MTRP CSI purposes. To this end, CMR0/1 and CMR2 need to be distinguished as different candidate groups from the viewpoint of the UE. Therefore, there is a need for a method for the UE to distinguish between the CMR corresponding to the STRP CSI and the CMR corresponding to the MTRP CSI.

Hereinafter, the present disclosure proposes a method for setting/instructing a port combination for each RI when performing MTRP CSI calculation/obtaining/reporting for a CMR combination and a method for the UE to distinguish CMR corresponding to STRP CSI and CMR corresponding to MTRP CSI based on the aforementioned reason and purpose.

Second Embodiment

In this embodiment, a method of setting/instructing a port combination for each RI when calculating/obtaining/reporting MTRP CSI for a CMR combination will be described.

The methods described below are only divided for convenience of description, and the configuration of one method may be substituted with the configuration of another method or may be applied in combination with each other. And/or, in the proposed method of the second embodiment, contents of the aforementioned CSI-related operation and multi-TRP-related operation may be referred to.

A non-PMI based CSI report may be set/indicated in a specific reporting setting, and a specific CMR combination may be set/indicated/defined to the UE for NZP CSI-RS (CMR) for CM set in the corresponding reporting setting. In this case, a port index for each RI may be set/indicated/defined for the specific CMR combination.

The 'specific reporting setting' may refer to a reporting setting configured/instructed to report single TRP CSI and/or multi-TRP CSI. To this end, as an example, a target reportQuantity may be set, and/or a parameter for implicitly/explicitly instructing the operation may be set/indicated.

The 'non-PMI based CSI report' may refer to a report that does not require PMI reporting as in the current standard, where reportQuantity is set to 'cri-RI-CQI'.

If 'port index for each RI is set/indicated/defined for a specific CMR combination',

- a port index for each RI may be set/indicated/defined for each CMR. For example, for CMR0, CMR1, {CMR0, CMR1}, a port index for each RI for CMR0 and CMR1 may be set/indicated/defined, and for {CMR0,CMR1}, a port index for each RI for CMR0 and CMR1 may be additionally set/indicated/defined. In this case, for the same CMR, the port index for each RI for STRP CSI and for MTRP CSI may be independently set/indicated/defined.
- And/or, a single setting value may be equally applied to the entire CMR combination set in the specific reporting setting.
- And/or, a port index for each RI may be set/indicated/defined for each CMR combination.
- And/or, when the port index for each RI is set/indicated/defined for each CMR combination, it may be interpreted as being set/indicated/defined for each state of a specific bit(s) defined in the CSI payload to report a specific CMR combination (and/or a specific CMR) when reporting CSI. For example, when CMR0/1/2/3 is set in reporting setting #1, and a combination of {CMR0,CMR1}, {CMR2,CMR3} is set/indicated/defined, a port index for each RI may be set/indicated/defined in a state corresponding to {CMR0,CMR1} and a state corresponding to {CMR2,CMR3} of a specific bit(s) in a CSI payload defined to report a specific combination of the two combinations (and/or defined to report a specific CMR).

The following shows an example of applying the proposed method.

non-PMI-PortIndication for CMR0: $p_0^{(1)}$, $p_0^{(2)}$, $p_1^{(2)}$, $p_0^{(3)}$, $p_1^{(3)}$, $p_2^{(3)}$, $p_2^{(3)}$, ..., $p_0^{(R)}$, $p_1^{(R)}$, ..., $p_{R-1}^{(R)}$ non-PMI-PortIndication for CMR1: $p'_0^{(1)}$, $p'_0^{(2)}$, $p'_1^{(2)}$, $p'_0^{(3)}$, $p'_1^{(3)}$, $p'_2^{(3)}$, $p'_2^{(3)}$, ..., $p'_0^{(R)}$, $p'_1^{(R)}$, ..., $p'_{R-1}^{(R)}$ non-PMI-PortIndication for {CMR0, CMR1}: $p''_0^{(1)}$, $p''_0^{(2)}$, $p''_1^{(2)}$, $p''_0^{(3)}$, $p''_1^{(3)}$, $p''_2^{(3)}$, $p''_2^{(3)}$, ..., $p''_0^{(R)}$, $p''_1^{(R)}$, ..., $p''_{R-1}^{(R)}$ In the above example, R may refer to a rank (value) for each CMR and/or a rank (value) for each TRP.

In the above example, $p_k^{(K)}$, $p'_k^{(K)}$, $p''_k^{(K)}$ may have different values depending on the setting.

In the above example, it may have a set value that satisfies $\overline{R}=2R$.

In the above example, in order to set a port index for each RI with respect to a CMR combination, a rule for port indexing for a CMR combination may be defined for ports in different CMRs of a specific CMR combination. For example, port indexing may be performed based on a specific order (e.g., ascending/descending order, etc.) from a port within a specific CMR (e.g., CMR of lowest/highest/first/last index, etc.). For example, for {CMR0, CMR1}, if 4 ports are configured in each CMR, (the total number of ports in CMR0)+4 may be applied to ports included in ports 0, 1, 2, 3, from port included in CMR0 to define 4, 5, 6, and 7.

The following shows another example of applying the proposed method.

non-PMI-PortIndication for CMR0: $p_0^{(1)}$, $p_0^{(2)}$, $p_1^{(2)}$, $p_0^{(3)}$, $p_1^{(3)}$, $p_2^{(3)}$, $p_2^{(3)}$, ..., $p_0^{(R)}$, $p_1^{(R)}$, ..., $p_{R-1}^{(R)}$ (same as above example)

non-PMI-PortIndication for CMR1: $p'_0^{(1)}$, $p'_0^{(2)}$, $p'_1^{(2)}$, $p'_0^{(3)}$, $p'_1^{(3)}$, $p'_2^{(3)}$, $p'_2^{(3)}$, ..., $p'_0^{(R)}$, $p'_1^{(R)}$, ..., $p'_{R-1}^{(R)}$ (same as above example)

Non-PMI-PortIndications for {CMR0, CMR1}:

For CMR0: $p_0^{(1,MTRP)}$, $p_0^{(2,MTRP)}$, $p_1^{(2,MTRP)}$, $p_0^{(3,MTRP)}$, $p_1^{(3,MTRP)}$, $p_2^{(3,MTRP)}$, ..., $p_0^{(R,MTRP)}$, $p_1^{(R,MTRP)}$, ..., $p_{R-1}^{(R,MTRP)}$

For CMR1: $p'_0^{(1,MTRP)}$, $p'_0^{(2,MTRP)}$, $p'_1^{(2,MTRP)}$, $p'_0^{(3,MTRP)}$, $p'_1^{(3,MTRP)}$, $p'_2^{(3,MTRP)}$, ..., $p'_0^{(R,MTRP)}$, $p'_1^{(R,MTRP)}$, ..., $p'_{R-1}^{(R,MTRP)}$

The above example shows an example in which a port index for each RI is set for each CMR in a specific CMR combination (i.e., {CMR0,CMR1} combination). The proposed method may be more suitable for a case in which RIs are separately reported for each CMR.

In the above example, a case in which one CMR combination is configured for the UE has been mainly described, but it is obvious that a plurality of CMR combinations may be configured. In this case, the base station may set a plurality of CMR combinations to the terminal and set/instruct/define the terminal to report a specific CMR combination. And/or, the base station may configure/indicate a specific CMR combination to the terminal based on RRC/MAC-CE/DCI. And/or, CMR for STRP CSI calculation/obtaining/reporting may be transmitted for each TRP, and port configuration for MTRP CSI calculation/obtaining/reporting may be agreed in advance, or CMR combination (set) with RRC/MAC-CE may be set/indicated.

When setting/instructing the CMR combination set, the UE may additionally report the best combination (preferred combination). And/or, in cri-ri-cqi, cri may be reused for a combined report or a new field may be introduced, and ri-cqi may follow the existing non-PMI-port indication. In relation to the above operation, the number of (configurable) CMR combinations may be determined based on the capability of the terminal.

And/or, it may be defined that a CSI processing unit (CPU) occupation linearly increases according to the number of CMR combinations. For example, as the number of CMR combinations increases to 1/2/3, the CPU required therefor may increase to 1/2/3.

Based on the above proposed method, when there is no separate port index setting/indication for each RI in the CMR combination for MTRP CSI, the port index for each RI set for each CMR (and/or if there is no setting for each CMR, it may be applied in ascending order of port index as defined in the current standard) may be applied as it is even in the MTRP CSI calculation. At this time, when the RI for MTRP CSI is named RI_MTRP, when RI_MTRP is an even number when calculating CQI for MTRP CSI, the RI of each CMR may correspond to RI_MTRP/2, and when RI_MTRP is an odd number, the specific CMR may correspond to floor(RI_MTRP/2)+1 and another CMR may correspond to floor(RI_MTRP/2). Here, it is obvious that the floor operation may be replaced with an operation such as ceil/round. The 'specific CMR' may be set/instructed by the base station to the terminal based on L1/L2 signaling, or may be defined as a fixed rule. As an example defined as a fixed rule, the lowest (and/or highest index/first/last/, etc.) CMR may be defined to correspond to the specific CMR.

Based on the above proposed method, when calculating MTRP CSI based on a CMR combination, the following definition may be applied for CQI calculation.

Definition

When calculating a CQI for a rank for a CMR pair (or resource pair), the UE should use the ports indicated for the corresponding rank for the CSI-RS resources selected from the corresponding CMR pair. It should be assumed that a precoder for the indicated ports is an identity matrix scaled by 1/sqrt(v). Here, v is equal to the total rank number of the corresponding CMR pair.

In the above definition, 'CMR pair' may refer to a CMR combination for MTRP CSI calculation/obtaining/reporting. The 'CMR pair' may also be referred to as a 'resource pair'.

And/or, in addition to or in place of the above proposal, the port index(es) preferred by the UE for the CMR combination set/indicated/defined for MTRP CSI calculation/obtaining/reporting may be reported to the base station. For example, if CMR0/1/2/3 is set in reporting setting #1 and a combination of {CMR0,CMR1}, {CMR2,CMR3} is set/indicated/defined, a CQI is calculated based on the port index(es) configured/instructed/defined to the UE for each of CMR0/1/2/3, and based on this, CMR and RI/CQI preferred by the UE (corresponding to the STRP CSI) may be reported. Also, for the {CMR0,CMR1} or {CMR2,CMR3} combination, the (total) RI for the CMR combination and a CQI corresponding thereto are calculated based on the port index(es) set/indicated/defined in each of CMR0, CMR1 or CMR2, CMR3, and for a CMR combination and the (total) RI preferred by the UE and the (total) RI, port index(es) (preferred by the UE) corresponding to each CMR may be (additionally) reported.

And/or, the best (e.g., preferred by the UE) port and/or worst (e.g., non-preferred by the UE) companion port index(es) may be reported to the base station.

Third Embodiment

In this embodiment, a method for the UE to distinguish between CMR corresponding to STRP CSI and CMR corresponding to MTRP CSI will be described.

The methods described below are only divided for convenience of description, and a configuration of one method may be substituted with a configuration of another method or may be applied in combination with each other. And/or, in the proposed method of the first embodiment, contents of the CSI-related operation and multi-TRP-related operation described above may be referred to.

A non-PMI based CSI report may be set/indicated in a specific reporting setting, and different CMR groups for reporting a specific CMR among CMR candidates for NZP CSI-RS (CMR) for CM set in the corresponding reporting setting may be set/indicated/defined to the UE. The UE may report a specific CMR among CMRs in the same CMR group to the base station.

The 'specific reporting setting' may refer to a reporting setting configured/instructed to report single TRP CSI and/or multi-TRP CSI. To this end, as an example, a target reportQuantity may be set, and/or a parameter for implicitly/explicitly instructing the operation may be set/indicated.

The 'non-PMI based CSI report' may refer to a report that does not require PMI reporting as in the current standard, where reportQuantity is set to 'cri-RI-CQI'.

The 'CMR group' may be explicitly/implicitly configured/indicated to the UE based on L1/L2 signaling, and/or a CMR group may be defined based on a fixed rule.

An example of an explicit setting is as follows.

For each CMR, a parameter (e.g., CDM group index) for setting the CMR group may be set. For example, when CMR0/1/2/3 is set in Reporting setting #1, a specific CDM group index may be set for each CMR. When set to CMR0(index0), CMR1(index0), CMR(index1), and CMR (index1), specific CMR may be reported for CMR(s) (e.g., CMR0/1 for index( ) and CMR2/3 for index1) of the same index.

An example of an implicit setting is as follows.

CMR with port index setting for Rank1 (i.e., RI=1) (i.e., port index setting for rank1 in non-PMI-PortIndication) and CMR without port index setting for rank1 may be defined as different CMR groups. or example, if CMR0/1/2/3 is set in Reporting setting #1 and there is a port index setting for rank1 in CMR0/1 and there is no port index setting for rank1 in CMR2/3, CMR0/1 and CMR2/3 may be defined as different CMR groups and specific CMRs may be reported within the same CMR group. In the case of MTRP CSI, since CSI calculation/obtaining/reporting for rank1 may not be required, a CMR group for STRP CSI and a CMR group for MTRP CSI may be defined separately based on the above rule.

And/or, CMR with non-PMI-PortIndication configuration (for port index configuration for each RI) and CMR without non-PMI-PortIndication configuration may be defined as different CMR groups. For example, if CMR0/1/2/3 is set in Reporting setting #1 and there is non-PMI-PortIndication setting in CMR0/1 and there is no non-PMI-PortIndication setting in CMR2/3, CMR0/1 and CMR2/3 may be defined as different CMR groups and specific CMRs may be reported within the same CMR group.

Considering that non-PMI-PortIndication may be used to set the priority for each port differently for each terminal while simultaneously transmitting CSI-RS to which the same precoding is applied to multiple terminals, the non-PMI-PortIndication setting may be interpreted as considering the MU environment. Meanwhile, since the SU environment will be mainly considered in the MTRP transmission environment, there may not be a non-PMI-PortIndication configuration for the CMR corresponding to the MTRP CSI. Accordingly, a CMR group for STRP CSI and a CMR group for MTRP CSI may be defined based on the above rule, respectively.

And/or, different CMR groups may be defined based on the number of QCL reference RSs set/indicated/defined in CMR. For example, (in the case of excluding QCL-TypeD)

CMR(s) in which a single QCL reference RS is configured may be defined as one CMR group, and CMR(s) in which a plurality of QCL reference RSs are configured may be defined as another CMR group. And/or, when including QCL-TypeD, CMR(s) in which two or less QCL reference RSs are configured may be defined as one CMR group, and CMR(s) in which three or more QCL reference RSs are configured may be defined as another CMR group. The above example may be an example, and it is obvious that different values may be applied to the number of QCL reference RSs serving as a reference to distinguish between different CMR groups.

In the above proposed method, it is assumed that CMR corresponding to STRP CSI or CMR corresponding to MTRP CSI is determined in units of CMR, and a method of determining STRP CSI and/or MTRP CSI in units of ports (groups) within a single CMR may be applied. For example, for N ports configured in a specific CMR, N_1 ports may be defined as ports for STRP CSI, and N_2 ports may be defined as ports for MTRP CSI. (At this time, it may be defined to satisfy N=N_1+N_2.) The 'port group' may be explicitly/implicitly set/instructed to the UE based on L1/L2 signaling, and/or defined based on a fixed rule.

An example of an explicit setting is as follows.

For each CMR, a parameter (e.g., port group index) for port group setting may be set. For example, when CMR0 is set in Reporting setting #1, a specific port group index may be set for each port in CMR0. When port0(index0), port1(index0), port(index1), port(index1) are set, port(s) of the same index may be defined as the same port group, and different RIs/CQIs may be reported for ports in the same group. For example, the RI/CQI preferred by the UE from the STRP CSI viewpoint may be reported for port group 0, and/or the RI/CQI preferred by the UE from the MTRP CSI viewpoint may be reported for port group 1.

An example of an implicit setting is as follows.

For the total number of ports N configured in a single CMR, port group 0 for STRP CSI and port 1 for MTRP CSI may be defined to be divided into N/2 ports each. For example, if 4port is configured in CMR0 of Reporting setting #1, port0/1 may be defined as a port group for STRP CSI, and port2/3 may be defined as a port group for MTRP CSI.

When different port groups may be defined within a single CMR as described above, a precoding matrix applicable to the base station for STRP CSI calculation/obtaining/reporting and a precoding matrix that may be applied for MTRP CSI calculation/obtaining/reporting may be applied differently, thus having the advantage that the precoding matrix optimized for each situation may be applied.

Hereinafter, FIGS. 15 and 16 show examples of signaling between a base station and a terminal to which the proposed method (e.g., the first to third embodiments) may be applied. Here, the terminal/base station may be an example, and may be replaced with various devices as described in FIGS. 17 to 20 described later. FIGS. 15 and 16 are only for convenience of description, and do not limit the scope of the present disclosure. In addition, some step(s) shown in FIGS. 15 and 16 may be omitted depending on circumstances and/or settings. In addition, in the operation of the base station/terminal of FIGS. 15 and 16, the aforementioned contents may be referenced/used.

In the following description, the base station may be one base station including a plurality of TRPs. And/or, the base station may be one cell including a plurality of TRPs. And/or, the base station may include a plurality of remote radio heads (RRHs)/remote radio units (RRUs). As an example, an ideal/non-ideal backhaul may be set between TRP 1 and TRP 2 constituting the base station. Also, hereinafter, the base station may be replaced with "multiple TRPs", "multiple panel/cells" or "multiple RRH/RRU" and applied.

In addition, as described above, "TRP" may be substituted to be applied as a panel, an antenna array, a cell (e.g., macro cell/small cell/pico cell, etc.), TP (transmission point), base station (gNB, etc.). In addition, the base station may refer to a generic term for an object that transmits and receives data with the terminal. For example, the base station may be a concept including one or more TPs (Transmission Points), one or more TRPs (Transmission and Reception Points), and the like. In addition, the TP and/or TRP may include a panel of the base station, a transmission and reception unit, and the like.

In addition, although not shown in FIGS. 15 and 16, the terminal may transmit UE capability to the base station. The UE capability may include capability information of the UE related to the operations described in the proposed methods (e.g., the first to third embodiments) described above.

FIG. 15 is a flowchart illustrating an operating method of a terminal proposed in the present disclosure.

Referring to FIG. 15, first, in step S1501, the terminal (100/200 in FIGS. 17 to 20) may receive information on channel state information-reference signal (CSI-RS) resource set (e.g., NZP CSI-RS resource set IE in Table 5). For example, the CSI-ReportConfig IE of Table 6 may include information on a CSI-RS resource set.

And/or, the information on the CSI-RS resource set may include information on a resource pair. For example, the NZP CSI-RS resource set IE of Table 5 may include a higher layer parameter indicating information on a resource pair. And/or, a resource pair may be a resource unit for calculating the CSI. And/or, the resource pair may correspond to at least one interference measurement resource (IMR). For example, one resource pair may correspond to one IMR.

And/or, the resource pair may include a first channel measurement resource (CMR) and a second CMR configured in the same slot as the first CMR. For example, CMR may be a resource for receiving CSI-RS or a resource for CM. For more specific details, reference may be made to the contents of the first embodiment.

And/or, the first CMR may be set as a first quasi co-location (QCL)-TypeD reference RS, and the second CMR may be set as a second QCL-TypeD reference RS. For example, the base station may set a Transmission Configuration Indication (TCI) state set. The TCI state may include information on the QCL type (e.g., higher layer parameter qcl-Type) and information on a reference signal (RS) for the corresponding QCL type (e.g., higher layer parameter referenceSignal). The QCL-TypeD reference RS may refer to an RS configured for QCL-TypeD. Here, QCL-TypeD may refer to something related to a spatial RX parameter. And/or, the first QCL-TypeD reference RS and the second QCL-TypeD reference RS may be the same RS. And/or, in the present disclosure, the QCL-TypeD reference RS may be referred to as a beam.

And/or, the third QCL-TypeD reference RS may correspond to an RS different from the first QCL-TypeD reference RS and/or the second QCL-TypeD reference RS. And/or, the resource, channel, and/or signal set as the third QCL-TypeD reference RS may not be received in the same time domain as the first CMR or the second CMR. For example, the resource may be CMR, IMR, or the like. The channel may be a PDSCH, a PDCCH, or the like. The signal may be DMRS, CSI-RS, or the like. For more specific details, reference may be made to the contents of the first embodiment.

And/or, the first CMR and/or the second CMR may be set as at least one antenna port index for each rank indicator (RI). For example, for the resource pair, CMR0 may be set to $p_0^{(1,MTRP)}$, $p_0^{(2,MTRP)}$, $p_1^{(2,MTRP)}$, $p_0^{(3,MTRP)}$, $p_1^{(3,MTRP)}$, $p_2^{(3,MTRP)}$, ..., $p_0^{(R,MTRP)}$, $p_1^{(R,MTRP)}$, ..., $p_{R-1}^{(R,MTRP)}$, and CMR1 may be set to $p'_0{}^{(1,MTRP)}$, $p'_0{}^{(2,MTRP)}$, $p'_1{}^{(2,MTRP)}$, $p'_0{}^{(3,MTRP)}$, $p'_1{}^{(3,MTRP)}$, $p'_2{}^{(3,MTRP)}$, ..., $p'_0{}^{(R,MTRP)}$, $p'_1{}^{(R,MTRP)}$, ..., $p'_{R-1}{}^{(R,MTRP)}$. Here, R may refer to a rank (value). And/or, the CSI may be CSI that does not include PMI (e.g., non-PMI based CSI). And/or, in the present disclosure, the antenna port may be referred to as a port. For more specific details, reference may be made to the content of the second embodiment.

In the present disclosure, CMR may be referred to as a resource for CM or a resource included in a CSI-RS resource set for CM. For example, the resource may be an NZP CSI-RS resource.

For example, the operation of the terminal receiving information on the CSI-RS resource set in step S1501 may be implemented by the device of FIGS. 17 to 20 described above. For example, referring to FIG. 18, one or more processors 102/202 may control one or more memories 104/204 and/or one or more transceivers 106/206 to receive information on a CSI-RS resource set.

And/or, the UE (100/200 in FIGS. 17 to 20) may receive at least one CSI-RS based on the first CMR and the second CMR in step S1502.

For example, at least one CSI-RS may include a CSI-RS(s) received in a first CMR from a first transmission reception point (TRP) and a CSI-RS(s) received in a second CMR from a second TRP. Here, two TRP operations have been exemplified, but of course, the proposed method of the present disclosure may also be applied to one or more TRP operations.

For example, the operation of the terminal receiving at least one CSI-RS in step S1502 may be implemented by the device of FIGS. 17 to 20 described above. For example, referring to FIG. 18, one or more processors 102/202 may control one or more memories 104/204 and/or one or more transceivers 106/206, etc to receive at least one CSI-RS.

And/or, the UE (100/200 in FIGS. 17 to 20) may transmit CSI based on at least one CSI-RS in step S1503.

For example, the CSI may be CSI for non-coherent joint transmission (NCJT).

For example, the operation of the UE transmitting the CSI in step S1503 may be implemented by the device of FIGS. 17 to 20 described above. For example, referring to FIG. 18, one or more processors 102/202 may control one or more memories 104/204 and/or one or more transceivers 106/206, etc. to transmit CSI.

The operation of the UE described with reference to FIG. 15 may refer to the CSI-related operation, multi-TRP-related operation, and the like described above.

Since the operation of the terminal described above with reference to FIG. 15 is the same as the operation of the terminal described above with reference to FIGS. 1 to 14 (e.g., the first to third embodiments), a detailed description other than that is omitted.

The signaling and operation described above may be implemented by a device (e.g., FIGS. 17 to 20) to be described below. For example, the aforementioned signaling and operation may be processed by one or more processors of FIGS. 17 to 20, and the aforementioned signaling and operation may also be stored in memory in the form of instructions are instructions/programs (e.g., instruction, executable code) for driving at least one processor of FIGS. 17 to 20.

For example, a processing apparatus configured to control a terminal to transmit channel state information (CSI) in a wireless communication system may include at least one processor and at least one memory operatively connected to the at least one processor and storing instructions for performing operations based on being executed by the at least one processor, wherein the operations include: receiving information on CSI-reference signal (RS) resource set, the information on the CSI-RS resource set including information on a resource pair, the resource pair including a first channel measurement resource (CMR) and a second CMR set in the same slot as that of the first CMR; receiving at least one CSI-RS based on the first CMR and the second CMR; and transmitting the CSI based on the at least one CSI-RS.

In another example, in a computer-readable storage medium storing at least one instruction for at least one processor to control operations, based on being executed by the at least one processor, the operations include: receiving information on CSI-reference signal (RS) resource set, the information on the CSI-RS resource set including information on a resource pair, the resource pair including a first channel measurement resource (CMR) and a second CMR set in the same slot as that of the first CMR; receiving at least one CSI-RS based on the first CMR and the second CMR; and transmitting the CSI based on the at least one CSI-RS.

FIG. 16 is a flowchart illustrating an operating method of a base station proposed in the present disclosure.

Referring to FIG. 16, first, in step S1601, the base station (100/200 in FIGS. 17 to 20) may transmit information (e.g.: NZP CSI-RS resource set IE of Table 5) on channel state information-reference signal (CSI-RS) resource set to the terminal. For example, the CSI-ReportConfig IE of Table 6 may include information on the CSI-RS resource set.

For example, the base station may include a first transmission reception point (TRP) and a second TRP. And/or, information on the CSI-RS resource may be transmitted from a single first TRP or a second TRP, or may be transmitted from the first TRP and the second TRP (i.e., two TRPs).

And/or, the information on the CSI-RS resource set may include information on a resource pair. For example, the NZP CSI-RS resource set IE of Table 5 may include a higher layer parameter indicating information on the resource pair. And/or, the resource pair may be a resource unit for calculating the CSI. And/or, the resource pair may correspond to at least one interference measurement resource (IMR). For example, one resource pair may correspond to one IMR.

And/or, the resource pair may include a first channel measurement resource (CMR) and a second CMR configured in the same slot as the first CMR. For example, CMR may be a resource for receiving CSI-RS or a resource for CM. For more specific details, reference may be made to the contents of the first embodiment.

And/or, the first CMR may be set as a first quasi co-location (QCL)-TypeD reference RS, and the second CMR may be set as a second QCL-TypeD reference RS. For example, the base station may set a transmission configuration indication (TCI) state. The TCI state may include information on a QCL type (e.g., higher layer parameter qcl-Type) and information on a reference signal (RS) for the corresponding QCL type (e.g., higher layer parameter referenceSignal). The QCL-TypeD reference RS may refer to an RS configured for QCL-TypeD. Here, QCL-TypeD may refer to something related to a spatial RX parameter. And/or, the first QCL-TypeD reference RS and the second QCL-TypeD reference RS may be the same RS. And/or, in the present disclosure, the QCL-TypeD reference RS may be referred to as a beam.

And/or, the third QCL-TypeD reference RS may correspond to an RS different from the first QCL-TypeD reference RS and/or the second QCL-TypeD reference RS. And/or, the resource, channel, and/or signal set as the third QCL-TypeD reference RS may not be received in the same time domain as the first CMR or the second CMR. For example, the resource may be CMR, IMR, or the like. The channel may be a PDSCH, a PDCCH, or the like. The signal may be DMRS, CSI-RS, or the like. For more specific details, reference may be made to the contents of the first embodiment.

And/or, the first CMR and/or the second CMR may be set as at least one antenna port index for each rank indicator (RI). For example, for the resource pair, CMR0 may be set to $p_0^{(1,MTRP)}$, $p_0^{(2,MTRP)}$, $p_1^{(2,MTRP)}$, $p_0^{(3,MTRP)}$, $p_1^{(3,MTRP)}$, $p_2^{(3,MTRP)}$, ..., $p_0^{(R,MTRP)}$, $p_1^{(R,MTRP)}$, ..., $p_{R-1}^{(R,MTRP)}$, and CMR1 may be set to $p'_0{}^{(1,MTRP)}$, $p'_0{}^{(2,MTRP)}$, $p'_1{}^{(2,MTRP)}$, $p'_0{}^{(3,MTRP)}$, $p'_1{}^{(3,MTRP)}$, $p'_2{}^{(3,MTRP)}$, ..., $p'_0{}^{(R,MTRP)}$, $p'_1{}^{(R,MTRP)}$, ..., $p'_{R-1}{}^{(R,MTRP)}$. Here, R may refer to rank (value). And/or, the CSI may be CSI that does not include PMI (e.g., non-PMI based CSI). And/or, in the present disclosure, the antenna port may be referred to as a port. For more specific details, reference may be made to the content of the second embodiment.

In the present disclosure, CMR may be referred to as a resource for CM or a resource included in a CSI-RS resource set for CM. For example, the resource may be an NZP CSI-RS resource.

For example, the operation of the base station transmitting information on the CSI-RS resource set in step S1601 may be implemented by the device of FIGS. 17 to 20 described above. For example, referring to FIG. 18, one or more processors 102/202 may control one or more memories 104/204 and/or one or more transceivers 106/206 to transmit information on a CSI-RS resource set.

And/or, the base station (100/200 in FIGS. 17 to 20) may transmit at least one CSI-RS to the terminal based on the first CMR and the second CMR in step S1602.

For example, the at least one CSI-RS may include CSI-RS(s) transmitted from the first TRP in the first CMR and CSI-RS(s) transmitted from the second TRP in the second CMR. For example, at least one CSI-RS may include CSI-RS(s) transmitted from two or more TRPs.

For example, the operation of the base station transmitting at least one CSI-RS in step S1602 may be implemented by the device of FIGS. 17 to 20 described above. For example, referring to FIG. 18, one or more processors 102/202 may control one or more memories 104/204 and/or one or more transceivers 106/206, etc. to transmit at least one CSI-RS.

And/or, the base station (100/200 in FIGS. 17 to 20) may receive CSI from the terminal based on at least one CSI-RS in step S1603. For example, the UE may transmit CSI to the first TRP and/or the second TRP. In the example of FIG. 17, two TRP operations have been mainly described, but the proposed method of the present disclosure may be applied to one or three or more TRP operations.

For example, the CSI may be CSI for non-coherent joint transmission (NCJT).

For example, the operation of the base station receiving the CSI in step S1603 may be implemented by the device of FIGS. 17 to 20 described above. For example, referring to FIG. 18, one or more processors 102/202 may control one or more memories 104/204 and/or one or more transceivers 106/206, etc. to receive CSI.

The operation of the base station described with reference to FIG. 16 may refer to the aforementioned CSI-related operation, multi-TRP-related operation, and the like.

Since the operation of the base station described above with reference to FIG. 16 is the same as the operation of the base station described above with reference to FIGS. 1 to 15 (e.g., the first to third embodiments), a detailed description other than that is omitted.

The aforementioned signaling and operation may be implemented by a device (e.g., FIGS. 17 to 20) to be described below. For example, the aforementioned signaling and operation may be processed by one or more processors of FIGS. 17 to 20, and the aforementioned signaling and operation may be stored in the memory in the form of instructions/programs (instructions, executable code) for driving at least one processor.

For example, a processing apparatus configured to control a user equipment (UE) to transmit channel state information (CSI) in a wireless communication system includes at least one processor; and at least one memory operatively coupled to the at least one processor and configured to store instructions for performing operations based on being executed by the at least one processor, wherein the operations include: receiving information on CSI-reference signal (RS) resource set, the information on the CSI-RS resource set including information on a resource pair, the resource pair including a first channel measurement resource (CMR) and a second CMR set in the same slot as that of the first CMR; receiving at least one CSI-RS based on the first CMR and the second CMR; and transmitting the CSI based on the at least one CSI-RS.

In another example, in a computer-readable storage medium storing at least one instruction for at least one processor to control operations, based on being executed by the at least one processor, the operations include: receiving information on CSI-reference signal (RS) resource set, the information on the CSI-RS resource set including information on a resource pair, the resource pair including a first channel measurement resource (CMR) and a second CMR set in the same slot as that of the first CMR; transmitting at least one CSI-RS to the UE based on the first CMR and the second CMR; and receiving the CSI from the UE based on the at least one CSI-RS.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of wireless device applied to the present disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Application of Wireless Device Applied to the Present Disclosure

FIG. 19 illustrates another example of a wireless device applied to the present disclosure.

The wireless device may be implemented in various forms according to a use-case/service (refer to FIG. 17). Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 20 illustrates a hand-held device applied to the present disclosure. The hand-held device may include a smartphone, a smart pad, a wearable device (e.g., a smartwatch or a smart glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Here, the wireless communication technology implemented in the wireless devices 100 and 200 of the disclosure may include the narrowband Internet of Things for low-power communication as well as LTE, NR, and 6G. In this case, e.g., the NB-IoT technology may be an example of low power wide area network (LPWAN) technology, and may be implemented in standards, such as LTE Cat NB1 and/or LTE Cat NB2, and it is not limited to the above-mentioned name. Additionally or alternatively, the wireless communication technology implemented in the wireless devices 100 and 200 of the disclosure may perform communication based on LTE-M technology. In this case, as an example, the LTE-M technology may be an example of LPWAN technology, and may be called by various names, such as enhanced machine type communication (eMTC). For example, LTE-M technology may be implemented as at least any one of various standards, such as 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M, and is not limited to the aforementioned name. Additionally or alternatively, the wireless communication technology implemented in the wireless devices 100 and 200 of the disclosure may include at least any one of ZigBee, Bluetooth, and Low Power Wide Area Network (LPWAN) considering low power communication, and it is not limited to the above-mentioned name. For example, the ZigBee technology may create personal area networks (PAN) related to small/low-power digital communication based on various standards, such as IEEE 802.15.4, and it may be called by various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

An example in which the method of transmitting CSI in a wireless communication system of the present disclosure has been illustrated as being applied to the 3GPP LTE/LTE-A system and 5G system (new RAT system), but the method may be applied to various wireless communication systems, such as beyond 5G, 6G, beyond 6G, etc., in addition thereto.

The invention claimed is:

1. A method of transmitting channel state information (CSI) in a wireless communication system, the method performed by a user equipment (UE) comprising:
receiving information on CSI-reference signal (RS) resource set, the information on the CSI-RS resource set including information on a resource pair, the resource pair including a first channel measurement resource (CMR) and a second CMR set in the same slot as that of the first CMR,
receiving at least one CSI-RS based on the first CMR and the second CMR; and
transmitting the CSI based on the at least one CSI-RS,
wherein the first CMR is set as a first quasi co-location (QCL)-TypeD RS and the second CMR is set as a second QCL-TypeD RS,
wherein the first CMR is received based on a first beam for reception of the first QCL-TypeD RS and the second CMR is received based on a second beam for reception of the second QCL-TypeD RS,
wherein a third QCL-TypeD RS corresponds to an RS different from the first QCL-TypeD RS and the second QCL-TypeD RS, and a resource, a channel, or a signal set as the third QCL-TypeD RS is not received in the same time domain as that of the first CMR or the second CMR.

2. The method of claim 1, wherein the resource pair is a resource unit for calculating the CSI.

3. The method of claim 1, wherein the at least one CSI-RS includes a CSI-RS received in the first CMR from a first transmission reception point (TRP) and a CSI-RS received in the second CMR from a second TRP.

4. The method of claim 1, wherein the CSI is CSI for non-coherent joint transmission (NCJT).

5. The method of claim 1, wherein the resource pair corresponds to at least one interference measurement resource (IMR).

6. The method of claim 1, wherein the first CMR or the second CMR is set to at least one antenna port index for each rank indicator (RI).

7. A user equipment (UE) configured to transmit channel state information (CSI) in a wireless communication system, the UE comprising:
at least one transceiver; at least one processor; and at least one memory operatively coupled to the at least one processor and configured to store instructions for performing operations based on being executed by the at least one processor,
wherein the operations include:
receiving information on CSI-reference signal (RS) resource set, the information on the CSI-RS resource set including information on a resource pair, the resource pair including a first channel measurement resource (CMR) and a second CMR set in the same slot as that of the first CMR;
receiving at least one CSI-RS based on the first CMR and the second CMR; and
transmitting the CSI based on the at least one CSI-RS,
wherein the first CMR is set as a first quasi co-location (QCL)-TypeD RS and the second CMR is set as a second QCL-TypeD RS,
wherein the first CMR is received based on a first beam for reception of the first QCL-TypeD RS and the second CMR is received based on a second beam for reception of the second QCL-TypeD RS,
wherein a third QCL-TypeD RS corresponds to an RS different from the first QCL-TypeD RS and the second QCL-TypeD RS, and a resource, a channel, or a signal set as the third QCL-TypeD RS is not received in the same time domain as that of the first CMR or the second CMR.

8. A method of receiving channel state information (CSI) in a wireless communication system, the method performed by a base station (BS) comprising:

transmitting, to a user equipment (UE), information on CSI-reference signal (RS) resource set, the information on the CSI-RS resource set including information on a resource pair, the resource pair including a first channel measurement resource (CMR) and a second CMR set in the same slot as that of the first CMR, transmitting, to the UE, at least one CSI-RS based on the first CMR and the second CMR; and receiving, from the UE, the CSI based on the at least one CSI-RS, wherein the first CMR is set as a first quasi co-location (QCL)-TypeD RS and the second CMR is set as a second QCL-TypeD RS, wherein the first CMR is transmitted based on a first beam for reception of the first QCL-TypeD RS and the second CMR is transmitted based on a second beam for reception of the second QCL-TypeD RS, wherein a third QCL-TypeD RS corresponds to an RS different from the first QCL-TypeD RS and the second QCL-TypeD RS, and a resource, a channel, or a signal set as the third QCL-TypeD RS is not received in the same time domain as that of the first CMR or the second CMR.

9. The method of claim 8, wherein the resource pair is a resource unit for calculating the CSI.

10. The method of claim 8, wherein the at least one CSI-RS includes a CSI-RS transmitted in the first CMR by a first transmission reception point (TRP) and a CSI-RS transmitted in the second CMR by a second TRP.

11. The method of claim 8, wherein the CSI is CSI for non-coherent joint transmission (NCJT).

12. The method of claim 8, wherein the resource pair corresponds to at least one interference measurement resource (IMR).

13. The method of claim 8, wherein the first CMR or the second CMR is set to at least one antenna port index for each rank indicator (RI).

* * * * *